United States Patent
D'Souza et al.

(10) Patent No.: US 12,498,011 B2
(45) Date of Patent: Dec. 16, 2025

(54) DEVICE AND METHOD FOR CONTROLLING VIBRATION WITH PIECEWISE-LINEAR NONLINEARITY

(71) Applicant: Ohio State Innovation Foundation, Columbus, OH (US)

(72) Inventors: Kiran D'Souza, Dublin, OH (US); Meng-Hsuan Tien, Hsinchu (TW)

(73) Assignee: Ohio State Innovation Foundation, Columbus, OH (US)

( * ) Notice: Subject to any disclaimer, the term of this patent is extended or adjusted under 35 U.S.C. 154(b) by 962 days.

(21) Appl. No.: 17/631,678

(22) PCT Filed: Jul. 31, 2020

(86) PCT No.: PCT/US2020/044472
§ 371 (c)(1),
(2) Date: Jan. 31, 2022

(87) PCT Pub. No.: WO2021/022146
PCT Pub. Date: Feb. 4, 2021

(65) Prior Publication Data
US 2022/0282763 A1 Sep. 8, 2022

Related U.S. Application Data

(60) Provisional application No. 62/881,113, filed on Jul. 31, 2019.

(51) Int. Cl.
*F16F 7/10* (2006.01)
*F16F 15/00* (2006.01)
(Continued)

(52) U.S. Cl.
CPC .......... *F16F 7/1005* (2013.01); *F16F 15/002* (2013.01); *F16F 15/022* (2013.01);
(Continued)

(58) Field of Classification Search
CPC ...... F16F 7/1005; F16F 15/002; F16F 15/022; F16F 2228/04; F16F 2228/06;
(Continued)

(56) References Cited

U.S. PATENT DOCUMENTS 5,182,887 A    2/1993  Uno et al.
5,500,578 A *  3/1996  Kawamura .............. H02N 2/14
                                                        318/116

(Continued)

FOREIGN PATENT DOCUMENTS

IT    20130012 A1   4/2014
JP     3786489 B2   6/2006

OTHER PUBLICATIONS

Abdalla et al. Enhanced Structural Damage Detection Using Alternating Projection Methods. AIAA Journal 1998; 36(7):1305-11.
(Continued)

*Primary Examiner* — David Luo
(74) *Attorney, Agent, or Firm* — Meunier Carlin & Curfman LLC

(57) ABSTRACT

Various implementations include a device for controlling vibration with piecewise-linear nonlinearity. The device includes a stiffness element, a mass, a stopper, and an actuator. The stiffness element is expandable and compressible along an axis. The mass is coupled to the stiffness element. The mass has a resting mass position along the axis. The actuator is coupled to the stopper. The actuator is configured to move the stopper along the axis to vary a gap size. The gap size is measured as a distance between the resting mass position and a resting stopper position.

19 Claims, 7 Drawing Sheets

(51) Int. Cl.
F16F 15/02 (2006.01)
G05B 19/404 (2006.01)

(52) U.S. Cl.
CPC ........ *G05B 19/404* (2013.01); *F16F 2228/04* (2013.01); *F16F 2228/06* (2013.01); *F16F 2230/18* (2013.01)

(58) Field of Classification Search
CPC ............... F16F 2230/18; F16F 2228/10; F16F 2230/007; F16F 7/104; G05B 19/404; H02N 2/188
USPC .................................................. 318/560, 630
See application file for complete search history.

(56) References Cited

U.S. PATENT DOCUMENTS

| 7,633,257 | B2* | 12/2009 | Sakamoto | ............... | G05D 19/02 |
| | | | | | 318/611 |
| 8,818,625 | B2* | 8/2014 | Muragishi | ............. | F16F 7/1005 |
| | | | | | 701/111 |
| 2015/0361658 | A1 | 12/2015 | Yamashina et al. | | |
| 2016/0209829 | A1 | 7/2016 | Nakamura et al. | | |

OTHER PUBLICATIONS

Adertino et al. Ocean wave energy converters: Status and challenges. Energies 11.5 (2018): 1250.
Agbabian et al. System Identification Approach to Detection of Structural Changes. ASCE Journal of Engineering Mechanics 1990; 117(2):370-90.
Al-Shudeifat et al. New Breathing Functions for the Transverse Breathing Crack of the Cracked Rotor Sexystem: Approach for Critical and Subcritical Harmonic Analysis. Journal of Sound and Vibration 2011; 330(3):526-44.
Amaravadi et al. Structural health monitoring using wavelet transforms. In Smart Structures and Materials 2001: Smart Structures and Integrated Systems (vol. 4327, pp. 258-269). SPIE. Abstract only.
Amaravadi et al. Structural Integrity Monitoring of Composite Patch Repairs Using Wavelet Analysis and Neural Networks. SPIE's 9th Annual International Symposium on Smart Structures and Materials: 2002. SPIE; 2002. p. 11.
Amizic et al. Two-Dimensional Wavelet Mapping Techniques for Damage Detection in Structural Systems. SPIE's 9th Annual International Symposium on Smart Structures and Materials: 2002. SPIE; 2002. p. 12.
Apiwattanalunggarn et al. Component Mode Synthesis Using Nonlinear Normal Modes. Nonlinear Dynamics 2005; 41(1-3):17-46.
Arnold. Review of Microscale Magnetic Power Generation. IEEE Transactions on Magnetics 2007; 43(11):3940-51.
Banea et al. Effect of Temperature on the Shear Strength of Aluminium Single Lap Bonded Joints for High Temperature Applications. Journal of Adhesion Science and Technology 2014; 28(14-15):1367-81.
Bennighof et al. An Automated Multilevel Substructuring Method for Eigenspace Computation in Linear Elastodynamics. SIAM Journal on Scientific Computing 2004; 25(6):2084-106.
Bhalla et al. High Frequency Piezoelectric Signatures for Diagnosis of Seismic/Blast Induced Structural Damages. Ndt & E International 2004; 37(1):23-33.
Bilotta et al. Indirect Identification Method of Bilinear Interface Laws for FRP Bonded on a Concrete Substrate. Journal of Composites for Construction 2012; 16(2):171-84.
Blair et al. Harmonic Balance and Continuation Techniques in the Dynamic Analysis of Duffing's Equation. Journal of Sound and Vibration 1997; 202(5):717-31.
Blystad et al. Piezoelectric Energy Harvester with a Mechanical End Stop on One Side. Microsystem Technologies-Micro-and Nanosystems-Information Storage and Processing Systems 2011; 17(4):505-11.

Bovsunovsky et al. Analytical Approach to the Determination of Dynamic Characteristics of a Beam with a Closing Crack. Journal of Sound and Vibration 2000; 235(3):415- 34.
Bovsunovsky et al. Considerations Regarding Superharmonic Vibrations of a Cracked Beam and the Variation in Damping Caused by the Presence of the Crack. Journal of Sound and Vibration 2005; 288(4-5):865-86.
Bovsunovsky et al. Diagnostics of Closing Cracks in Rodlike Elements at Nonlinear Resonances by the Method of Variation of the Asymmetry of Driving Forces. Strength of Materials 2010; 42(4):397-405.
Bovsunovsky et al. Non-Linearities in the Vibrations of Elastic Structures with a Closing Crack: A State of the Art Review. Mechanical Systems and Signal Processing 2015; 62-63:129-48.
Burlayenko et al. Influence of skin/core debonding on free vibration behavior of foam and honeycomb cored sandwich plates. International Journal of Non-Linear Mechanics 45.10 (2010): 959-968.
Buck. Synchronous Rhythmic Flashing of Fireflies. II. The Quarterly Review of Biology 1988; 63(3):265-89.
Burdio et al. A Unified Discrete-Time State-Space Model for Switching Converters. IEEE Transactions on Power Electronics 1995; 10(6):694-707.
Cao et al. Nonlinear Dynamic Characteristics of Variable Inclination Magnetically Coupled Piezoelectric Energy Harvesters. Journal of Vibration and Acoustics—Transactions of the ASME 2015; 137(2).
Cardona et al. A Multiharmonic Method for Nonlinear Vibration Analysis. International Journal for Numerical Methods in Engineering 1994; 37(9):1593-608.
Castanier et al. Modeling and Analysis of Mistuned Bladed Disk Vibration: Status and Emerging Directions. Journal of Propulsion and Power 2006; 22:384-96.
Cawley et al. A Comparison of the Natural Frequency Changes Produced by Cracks and Slots. Journal of Vibration Acoustics Stress and Reliability in Design-Transactions of the Asme 1988; 110(3):366-70.
Chancellor et al. Detecting Parameter Changes Using Experimental Nonlinear Dynamics and Chaos. Journal of Vibration and Acoustics-Transactions of the ASME 1996; 118(3):375-83.
Chati et al. Analysis of a Cracked Beam. Journal of Sound and Vibration 1997; 207(2):249-70.
Chatterjee et al. Optimal Tracking of Parameter Drift in a Chaotic System: Experiment and Theory. Journal of Sound and Vibration 2002; 250(5):877-901.
Chelidze et al. A Dynamical Systems Approach to Damage Evolution Tracking, Part 1: Description and Experimental Application. Journal of Vibration and Acoustics—Transactions of the ASME 2002; 124(2):250-7.
Chelidze. Identifying Multidimensional Damage in a Hierarchical Dynamical System. Nonlinear Dynamics 2004; 37:307-22.
Chelidze et al. A Dynamical Systems Approach to Failure Prognosis. Journal of Vibration and Acoustics-Transactions of the ASME 2004; 126(1):2-8.
Chelidze et al. Dynamical Systems Approach to Fatigue Damage Identfication. Journal of Sound and Vibration 2005; 281(3-5):887-904.
Chen et al. Normal Modes for Piecewise Linear Vibratory Systems. Nonlinear Dynamics 1996; 10(2):135-64.
Choi et al. Nonlinear Behavior and Chaotic Motions of an Sdof System with Piecewise—Non-Linear Stiffness. International Journal of Non-Linear Mechanics 1991; 26(5):461-73.
Chondros et al. A Continuous Cracked Beam Vibration Theory. Journal of Sound and Vibration 1998; 215(1):17-34.
Chondros et al. Vibration of a Beam with a Breathing Crack. Journal of Sound and Vibration 2001; 239(1):57-67.
Cigeroglu et al. Nonlinear Vibration Analysis of Bladed Disks with Dry Friction Dampers. Journal of Sound and Vibration 2006; 295(3-5):1028-43.
Cigeroglu et al. A Microslip Friction Model with Normal Load Variation Induced by Normal Motion. Nonlinear Dynamics 2007; 50(3):609-26.

(56) References Cited

OTHER PUBLICATIONS

Cigeroglu et al. Forced Response Prediction of Constrained and Unconstrained Structures Coupled through Frictional Contacts. Journal of Engineering for Gas Turbines and Power—Transactions of the ASME 2009; 131(2).
Collins et al. Free and Forced Longitudinal Vibrations of a Cantilevered Bar with a Crack. Journal of Vibration and Acoustics-Transactions of the ASME 1992; 114(2):171-7.
Craig et al. Coupling of Substructures for Dynamic Analyses. AIAA Journal 1968; 6(7):1313-9.
Csaba. Forced Response Analysis in Time and Frequency Domains of a Tuned Bladed Disk with Friction Dampers. Journal of Sound and Vibration 1998; 214(3):395-412.
Daqaq et al. On the Role of Nonlinearities in Vibratory Energy Harvesting: A Critical Review and Discussion. Applied Mechanics Reviews 2014; 66(4).
Das et al. Performance of Base Isolated Building Considering Limitation on Excessive Isolator Displacement. Structure and Infrastructure Engineering 2015; 11(7):904-17.
Davies et al. Impact Dynamics in Milling of Thin-Walled Structures. Nonlinear Dynamics 2000; 22(4):375-92.
Dechant et al. Low-frequency, broadband vibration energy harvester using coupled oscillators and frequency up-conversion by mechanical stoppers. Smart Materials and Structures 26.6 (2017): 065021.
De Freitas et al. Multistability, Basin Boundary Structure, and Chaotic Behavior in a Suspension Bridge Model. International Journal of Bifurcation and Chaos in Applied Sciences and Engineering 2004; 14(3):927-50.
Della et al. Vibration of Delaminated Composite Laminates: A Review. Applied Mechanics Reviews 2007; 60(1):1-20.
Dimarogonas. Vibration of Cracked Structures: A State of the Art Review. Engineering Fracture Mechanics 1996; 55(5):831-57.
Doole et al. A Piece Wise Linear Suspension Bridge Model: Nonlinear Dynamics and Orbit Continuation. Dynamics and Stability of Systems 1996; 11(1):19-47.
D'Souza et al. Reduced-Order-Modeling for Nonlinear Analysis of Cracked Mistuned Multi-Stage Bladed Disk Systems. AIAA Journal 2011; 50(2):304-12.
D'Souza et al. A Statistical Characterization of the Effects of Mistuning in Multistage Bladed Disks. ASME Journal of Engineering for Gas Turbines and Power 2012; 134(1):1-8.
D'Souza et al. Analyzing Mistuned Multi-Stage Turbomachinery Rotors with Aerodynamic Effects. Journal of Fluids and Structures 2013; 42:388-400.
D'Souza et al. Forecasting Bifurcations from Large Perturbation Recoveries in Feedback Ecosystems. PLOS One 2015; 10(9):e0137779.
Dutoit et al. Design Considerations for MEMS-Scale Piezoelectric Mechanical Vibration Energy Harvesters. Integrated Ferroelectrics 2005;71:121-60.
Dutoit et al. Experimental Verification of Models for Microfabricated Piezoelectric Vibration Energy Harvesters. AIAA Journal 2007; 45(5):1126-37.
Erturk et al. A Distributed Parameter Electromechanical Model for Cantilevered Piezoelectric Energy Harvesters. Journal of Vibration and Acoustics-Transactions of the ASME 2008; 130(4).
Feeny et al. Parametric Identification of an Experimental of an Experimental Magneto-Elastic Oscillator. Journal of Sound and Vibration 2001;247(5):785-806.
Firrone et al. The Effect of Underplatform Dampers on the Forced Response of Bladed Disks by a Coupled Static/Dynamic Harmonic Balance Method. International Journal of Non-Linear Mechanics 2011; 46(2):363-75.
Firrone et al. Modeling the Microslip in the Flange Joint and Its Effect on the Dynamics of a Multistage Bladed Disk Assembly. Journal of Computational and Nonlinear Dynamics 2018; 13(1).
Friswell et al. Using Linear Model Reduction to Investigate the Dynamics of Structures with Local Non-Linearities. Mechanical Systems and Signal Processing 1995; 9(3):317-28.
Friswell et al. The Application of the IRS and Balanced Realization Methods to Obtain Reduced Models of Structures with Local Non-Linearities. Journal of Sound and Vibration 1996; 196(4):453-68.
Gan et al. A Mode-Accelerated XXr (MAX) Method for Complex Structures with Large Blends. Mechanical Systems and Signal Processing 2017; 93:1-15.
Gasch. A Survey of the Dynamic Behavior of a Simple Rotating Shaft with a Transverse Crack. Journal of Sound and Vibration 1993; 160(2):313-32.
Genesio et al. Harmonic Balance Methods for the Analysis of Chaotic Dynamics in Nonlinear Systems. Automatica 1992; 28(3):531-48.
Ghadami et al. Bifurcation Forecasting for Large Dimensional Oscillatory Systems: Forecasting Flutter Using Gust Responses. Journal of Computational and Nonlinear Dynamics 2016; 11(6):061009.
Ghadami et al. Forecasting the Post-Bifurcation Dynamics of Large-Dimensional Slow-Oscillatory Systems Using Critical Slowing Down and Center Space Reduction. Nonlinear Dynamics 2017; 88(1):415-31.
Ghanem et al. Structural-System Identification. I: Theory. Journal of Engineering Mechanics 1995; 121(2):255-64.
Giannini et al. Nonlinear Harmonic Identification of Breathing Cracks in Beams. Computers & Structures 2013; 129:166-77.
Glocker. Models of Non-Smooth Switches in Electrical Systems. International Journal of Circuit Theory and Applications 2005; 33(3):205-34.
Glynne-Jones et al. Electromagnetic, Vibration-Powered Generator for Intelligent Sensor Systems. Sensors and Actuators A: Physical 2004; 110(1-3):344-9.
Goebel et al. Hybrid Dynamical Systems. IEEE Control Systems 2009; 29(2):28-93.
Goulet et al. Data-Driven Post-Earthquake Rapid Structural Safety Assessment. Earthquake Engineering & Structural Dynamics 2015; 44(4):549-62.
Greene et al. Preparing Teachers and University Students to Translate Engineering Research to K8 Students in an After-School Program. 121st ASEE Annual Conference & Exposition. Indianapolis: American Society for Engineering Education; 2014.
Griffin. Friction Damping of Resonant Stresses in Gas-Turbine Engine Airfoils. Journal of Engineering for Power-Transactions of the ASME 1980; 102(2):329-33.
Gudmundson. Eigenfrequency Changes of Structures Due to Cracks, Notches or Other Geometrical Changes. Journal of the Mechanics and Physics of Solids 1982; 30(5):339-53.
Guyan. Reduction of Stiffness and Mass Matrices. AIAA Journal 1965; 3(2):380.
Hansel et al. Synchronization and Computation in a Chaotic Neural Network. Physical Review Letters 1992; 68(5):718.
Harne et al. Concise and High-Fidelity Predictive Criteria for Maximizing Performance and Robustness of Bistable Energy Harvesters. Applied Physics Letters 2013; 102(5).
Harne et al. Prospects for nonlinear energy harvesting systems designed near the elastic stability limit when driven by colored noise. Journal of Vibration and Acoustics 2013; 136, 021009-021009-8.
Harne et al. Prospects for Nonlinear Energy Harvesting Systems Designed near the Elastic Stability Limit When Driven by Colored Noise. Journal of Vibration and Acoustics—Transactions of the ASME 2014; 136(2).
Hernandez et al. Dynamic analysis of assembled aircraft structures with nonlinear joints. In58th AIAA/ASCE/AHS/ASC Structures, Structural Dynamics, and Materials Conference 2017, p. 1592.
Hernandez et al. Dynamic Analysis of Assembled Aircraft Structures Considering Interfaces with Nonlinear Behavior. Aerospace Science and Technology 2018; 77:265-72.
Hoffmann et al. Fabrication, Characterization and Modelling of Electrostatic Micro-Generators. Journal of Micromechanics and Microengineering 2009; 19(9).
Ibrahim. Recent Advances in Nonlinear Passive Vibration Isolators. Journal of Sound and Vibration 2008; 314(3-5):371-452.

(56) References Cited

OTHER PUBLICATIONS

Ilyas et al. Wave electrical energy systems: Implementation, challenges and environmental issues. Renewable and Sustainable Energy Reviews 2014:40, 260-268.
Imam et al. Development of an on-Line Rotor Crack Detection and Monitoring System. Journal of Vibration, Acoustics, Stress, and Reliability in Design 1989; 111(3):241-50.
Irons. Structural Eigenvalue Problems: Elimination of Unwanted Variables. AIAA Journal 1965; 3(5):961-2.
Ishida. Cracked Rotors: Industrial Machine Case Histories and Nonlinear Effects Shown by Simple Jeffcott Rotor. Mechanical Systems and Signal Processing 2008; 22(4):805-17.
Iwan. Steady-State Dynamic Response of a Limited Slip System. Journal of Applied Mechanics 1968; 35(2):322-6.
Jeon et al. Mems Power Generator with Transverse Mode Thin Film Pzt. Sensors and Actuators A: Physical 2005; 122(1):16-22.
Jiang et al. Large-Amplitude Non-Linear Normal Modes of Piecewise Linear Systems. Journal of Sound and Vibration 2004; 272(3-5):869-91.
Keiner et al. Comparison of Different Modelling Techniques to Simulate the Vibration of a Cracked Rotor. Journal of Sound and Vibration 2002; 254(5):1012-24.
Kim et al. Health Monitoring of Large Structures. Sound and Vibration 1995; 29(4):18-21.
Kim et al. Super- and Sub-Harmonic Response Calculations for a Torsional System with Clearance Nonlinearity Using the Harmonic Balance Method. Journal of Sound and Vibration 2005; 281(3-5):965-93.
Klinger et al. Fatigue Cracks in Railway Bridge Hangers Due to Wind Induced Vibrations—Failure Analysis, Measures and Remaining Service Life Estimation. Engineering Failure Analysis 2014; 43:232-52.
Klinger. Failures of Cranes Due to Wind Induced Vibrations. Engineering Failure Analysis 2014; 43:198-220.
Kurstak et al. Multistage Blisk and Large Mistuning Modeling Using Fourier Constraint Modes and Prime ASME Turbo Expo, Charlotte, NC: 2017. ASME; 2017.
Kwon et al. Dynamic Numerical Modeling and Simulation of Interfacial Cracks in Sandwich Structures for Damage Detection. Journal of Sandwich Structures and Materials 2002; 4(2):175-99.
Kwon et al. Performance Evaluation of Spaceborne Cryocooler Micro-Vibration Isolation System Employing Pseudoelastic SMA Mesh Washer. Cryogenics 2015; 67:19-27.
Lazaryan et al. Starting One-Dimensional Mechanical Systems with Pretensioned Shock Absorbers. Soviet Applied Mechanics 1969; 5(7):712-6.
Le et al. Microscale electrostatic energy harvester using internal impacts. Journal of Intelligent Material Systems and Structures 23, No. 13 (2012): 1409-1421.
Li et al. Nonlinear Analysis of a Cracked Rotor with Whirling. Applied Mathematics and Mechanics—English Edition 2002; 23(6):721-31.
Lim et al. Compact, Generalized Component Mode Mistuning Representation for Modeling Bladed Disk Vibration. AIAA Journal 2007; 45(9):2285-98.
Liu et al. A Mems-Based Piezoelectric Power Generator Array for Vibration Energy Harvesting. Microelectronics Journal 2008; 39(5):802-6.
Liu et al. Investigation of a MEMS piezoelectric energy harvester system with a frequency-widened-bandwidth mechanism introduced by mechanical stoppers. Smart Materials and Structures 21.3 (2012): 035005.
Liu et al. Recent Advances in Micro-Vibration Isolation. Mechanical Systems and Signal Processing 2015; 56-57:55-80.
Liu et al. Theoretical modeling and analysis of two-degree-of-freedom piezoelectric energy harvester with stopper. Sensors and Actuators A: Physical 245 (2016): 97-105.
Luo et al. Modeling of Microslip Friction and Its Application in the Analysis of Underplatform Damper. International Journal of Aeronautical and Space Sciences 2018; 19(2):388-98.
Luongo et al. Nonlinear Energy Sink to Control Elastic Strings: The Internal Resonance Case. Nonlinear Dynamics 2015; 81(1-2):425-35.
Lyons. Reducing FFT scalloping loss errors without multiplication. In Streamlining Digital Signal Processing (2012): 218.
Madden et al. Reduced-Order Modeling Approach for Blisks with Large Mass, Stiffness, and Geometric Mistuning. AIAA Journal 2012; 50(2):366-74.
Marinescu et al. Reduced Order Models of Mistuned Cracked Bladed Disks. Journal of Vibration and Acoustics 2011; 133(5).
Marinkovic et al. Demonstration of wide bandwidth energy harvesting from vibrations. Smart Materials and Structures 21.6 (2012): 065006.
Masri et al. A Nonparametric Identification Technique for Nonlinear Dynamic Problems. Journal of Applied Mechanics 1979; 46(2):433-47.
Masri et al. Identification of Nonlinear Vibrating Structures: Part I: Formulation. Journal of Applied Mechanics 1987; 109(54):918-22.
Matveev et al. Vibration-Based Diagnostics of Fatigue Damage of Beam-Like Structures. Journal of Sound and Vibration 2002; 249(1):23-40.
Mcinnes et al. Enhanced Vibrational Energy Harvesting Using Nonlinear Stochastic Resonance. Journal of Sound and Vibration 2008; 318(4-5):655-62.
Meninger et al. Vibration-to-Electric Energy Conversion. IEEE Transactions on Very Large Scale Integration (VLSI) Systems 2001; 9(1):64-76.
Menq et al. The Influence of Microslip on Vibratory Response. II: A Comparison with Experimental Results. Journal of Sound and Vibration 1986; 107(2):295-307.
Menq et al. The Influence of Microslip on Vibratory Response. I: A New Microslip Model. Journal of Sound and Vibration 1986; 107(2):279-93.
Mickens et al. Comments on the Method of Harmonic Balance. Journal of Sound and Vibration 1984; 94(3):456-60.
Mitcheson et al. Mems Electrostatic Micropower Generator for Low Frequency Operation. Sensors and Actuators A: Physical 2004; 115(2):523-9.
Mitra et al. Adaptive Microslip Projection for Reduction of Frictional and Contact Nonlinearities in Shrouded Blisks. Journal of Computational and Nonlinear Dynamics 2016; 11(4).
Natsiavas. On the dynamics of oscillators with bi-linear damping and stiffness. International Journal of Non-Linear Mechanics 1990: 25, 535-554.
O'Callahan et al. System Equivalent Reduction Expansion Process (SEREP). Seventh International Modal Analysis Conference. Las Vegas, Nevada; 1989.
Ormondroyd et al. Theory of the Dynamic Vibration Absorber. Transactions of the ASME 1928; 50:9-22.
Pappa et al. Autonomous Modal Identification of the Space Shuttle Tail Rudder. Journal of Spacecraft and Rockets 1998; 35(2):163-9.
Paradiso et al. Energy scavenging for mobile and wireless electronics. IEEE Pervasive Computing 2005, 4, 18-27.
Patton et al. Robust Fault-Detection of Jet Engine Sensor Systems Using Eigenstructure Assignment. Journal of Guidance Control and Dynamics 1992; 15(6):1491-7.
Pecora et al. Discontinuous and Nondifferentiable Functions and Dimension Increase Induced by Filtering Chaotic Data. Chaos 1996; 6(3):432-9.
Peng et al. Numerical Analysis of Cracked Beams Using Nonlinear Output Frequency Response Functions. Computers and Structures 2008; 86(17-18):1809-18.
Pescheck et al. A New Galerkin-Based Approach for Accurate Non-Linear Normal Modes through Invariant Manifolds. Journal of Sound and Vibration 2002; 249(5):971-93.
Petrov et al. Analytical Formulation of Friction Interface Elements for Analysis of Nonlinear Multi-Harmonic Vibrations of Bladed Disks. Journal of Turbomachinery—Transactions of the ASME 2003; 125:364-71.
Petrov et al. Generic Friction Models for Time-Domain Vibration Analysis of Bladed Disks. Journal of Turbomachinery - Transactions of the ASME 2004; 126:184-92.

(56) References Cited

OTHER PUBLICATIONS

Petrov et al. Effects of Damping and Varying Contact Area at Blade-Disk Joints in Forced Response Analysis of Bladed Disk Assemblies. Journal of Turbomachinery - Transactions of the ASME 2006; 128:403-10.
Petrov et al. Advanced Modeling of Underplatform Friction Dampers for Analysis of Bladed Disk Vibration. Journal of Turbomachinery 2007; 129(1):143-50.
Pierre et al. Multi-Harmonic Analysis of Dry Friction Damped Systems Using an Incremental Harmonic Balance Method. Journal of Applied Mechanics 1985; 52(4):958-64.
Plestan et al. Stable Walking of a 7-DOF Biped Robot. IEEE Transactions on Robotics and Automation 2003; 19(4):653-68.
Poulin et al. Generation of Electrical Energy for Portable Devices Comparative Study of an Electromagnetic and a Piezoelectric System. Sensors and Actuators A: Physical 2004; 116(3):461-71.
Pugno et al. Evaluation of the Non-Linear Dynamic Response to Harmonic Excitation of a Beam with Several Breathing Cracks. Journal of Sound and Vibration 2000; 235(5):749-62.
Quinn et al. Comparing Linear and Essentially Nonlinear Vibration-Based Energy Harvesting. Journal of Vibration and Acoustics 2011; 133(1).
Quinn. Modal Analysis of Jointed Structures. Journal of Sound and Vibration 2012; 331(1):81-93.
Ramlan et al. Potential Benefits of a Non-Linear Stiffness in an Energy Harvesting Device. Nonlinear Dynamics 2010; (4):545-58.
Renzi. Hydroelectromechanical modelling of a piezoelectric wave energy converter. Proceedings of the Royal Society A: Mathematical, Physical and Engineering Sciences 2016, 472, 20160715.
Rezaee et al. A New Approach to Free Vibration Analysis of a Beam with a Breathing Crack Based on Mechanical Energy Balance Method. Acta Mechanica Solida Sinica 2011; 24(2):185-94.
Roundy et al. A Study of Low Level Vibrations as a Power Source for Wireless Sensor Nodes. Computer Communications 2003; 26(11):1131-44.
Saavedra et al. Crack Detection and Vibration Behavior of Cracked Beams. Computers & Structures 2001; 79(16):1451-9.
Sadeghi et al. Geometric Approach to Nondestructive Identification of Faults in Stochastic Structural Systems. AIAA Journal 1997; 35(4):700-5.
Saito et al. Estimation and Veering Analysis of Nonlinear Resonant Frequencies of Cracked Plates. Journal of Sound and Vibration 2009; 326(3-5):725-39.
Saito et al. Node Sampling for Nonlinear Vibration Analysis of Structures with Intermittent Contact. AIAA Journal 2010; 48(9):1903-15.
Saito et al. Bilinear Modal Representations for Reduced-Order Modeling of Localized Piecewise-Linear Oscillators. Journal of Sound and Vibration 2011; 330(14):3442-57.
Sestieri. Structural Dynamic Modification. Sadhana-Academy Proceedings in Engineering Sciences 2000; 25:247-59.
Shampine et al. The matlab ode suite. SIAM journal on scientific computing 18.1 (1997): 1-22.
Shaw et al. A periodically forced piecewise linear oscillator. Journal of Sound and Vibration. 1983, 90, 129-155.
Shinozuka et al. Mitigation of Seismic Pounding Effect on Bridges Using Dynamic Restrainers. Smart Structures and Materials. Newport Beach, CA: SPIE; 2000. p. 377-87.
Shiryayev et al. Detection of Fatigue Cracks Using Random Decrement Signatures. Structural Health Monitoring 2010; 9(4):347-60.
Shiryayev et al. Parameter Estimation and Investigation of a Bolted Joint Model. Journal of Sound and Vibration 2007; 307(3-5):680-97.
Siewert et al. Multiharmonic Forced Response Analysis of a Turbine Blading Coupled by Nonlinear Contact Forces. Journal of Engineering for Gas Turbines and Power—Transactions of the ASME 2010; 132(8).
Sinou et al. The Influence of Cracks in Rotating Shafts. Journal of Sound and Vibration 2005; 285:1015-37.
Sohn et al. Damage Diagnosis Using Time Series Analysis of Vibration Signals. Smart Materials & Structures 2001; 10(3):446-51.
Sohn et al. Wavelet-Based Active Sensing for Delamination Detection in Composite Structures. Smart Materials & Structures 2004; 13(1):153-60.
Soliman et al. A Wideband Vibration-Based Energy Harvester. Journal of Micromechanics and Microengineering 2008; 18(11).
Soliman et al. A Design Procedure for Wideband Micropower Generators. Journal of Microelectromechanical Systems 2009; 18(6):1288-99.
Soom et al. Optimal-Design of Linear and Non-Linear Vibration Absorbers for Damped Systems. Journal of Vibration Acoustics Stress and Reliability in Design—Transactions of the ASME 1983; 105(1):112-9.
Stanton et al. Harmonic Balance Analysis of the Bistable Piezoelectric Inertial Generator. Journal of Sound and Vibration 2012; 331(15):3617-27.
Stewart et al. An Implicit Time-Stepping Scheme for Rigid Body Dynamics with Inelastic Collisions and Coulomb Friction. International Journal for Numerical Methods in Engineering 1996; 39(15):2673-91.
Stoisser et al. A Comprehensive Theoretical, Numerical and Experimental Approach for Crack Detection in Power Plant Rotating Machinery. Mechanical Systems and Signal Processing 2008; 22(4):818-44.
Sun et al. Vibration Isolation for Active Suspensions with Performance Constraints and Actuator Saturation. IEEE-ASME Transactions on Mechatronics 2015; 20(2):675-83.
Tanaka et al. Fault-Detection in Linear Discrete Dynamic-Systems by a Reduced Order Generalized-Likelihood-Ratio Method. International Journal of Systems Science 1993; 24(4):721-32.
Tehrani et al. Extending the Dynamic Range of an Energy Harvester Using Nonlinear Damping. Journal of Sound and Vibration 2014; 333(3):623-9.
Teich et al. Models of Nonlinear Vibration. II: Oscillator with Bilinear Stiffness. Acta Oto-Laryngologica 1989; 108(sup467):249-56.
Theodosiou et al. Dynamics of Finite Element Structural Models with Multiple Unilateral Constraints. International Journal of Non-Linear Mechanics 2009; 44(4):371-82.
Tien et al. A generalized bilinear amplitude and frequency approximation for piecewise-linear nonlinear systems with gaps or pre-stress. Nonlinear Dynamics 2017, 88, 2403-2416.
Tien et al. Generalized Bilinear Amplitude Approximation and X-Xr for Modeling Cyclically Symmetric Structures with Cracks. Journal of Vibration and Acoustics 2018, 140.
Tien et al. Efficient Analysis of Cyclic Symmetric Structures with Mistuning and Cracks. AIAA Scitech 2019 Forum, p. 0489, San Diego, California, 2019.
Tien et al. Statistical analysis of the nonlinear response of bladed disks with mistuning and cracks. AIAA Journal 57.11 (2019): 4966-4977.
Tsyfansky et al. Detection of Fatigue Cracks in Flexible Geometrically Non-Linear Bars by Vibration Monitoring. Journal of Sound and Vibration 1998; 213(1):159-68.
Tsyfansky et al. Non-Linear Vibration Method for Detection of Fatigue Cracks in Aircraft Wings. Journal of Sound and Vibration 2000; 236(1):49-60.
Tumer et al. Monitoring of Signals from Manufacturing Processes Using the Karhunen-Loeve Transform. Mechanical Systems and Signal Processing 2000; 14(6):1011-26.
Van Blarigan et al. A broadband vibrational energy harvester. Applied Physics Letters 100.25 (2012): 253904.
Vidmar et al. Nonlinear Interactions in Systems of Multiple Order Centrifugal Pendulum Vibration Absorbers. Journal of Vibration and Acoustics—Transactions of the ASME 2013; 135(6).
Vijayan et al. Non-Linear Energy Harvesting from Coupled Impacting Beams. International Journal of Mechanical Sciences 2015; 96-97:101-9.
Von Groll et al. The Harmonic Balance Method with Arc-Length Continuation in Rotor/Stator Contact Problems. Journal of Sound and Vibration 2001; 241:223-33.

(56) References Cited

OTHER PUBLICATIONS

Walker. Acoustic Synchrony: Two Mechanisms in the Snowy Tree Cricket. Science 1969; 166(3907):891-4.

Wallace. Ultrafast scientific lasers expand on their legacy. Laser Focus World 2015; 51(3):42-7.

Wei et al. A Comprehensive Review on Vibration Energy Harvesting: Modelling and Realization. Renewable & Sustainable Energy Reviews 2017; 74:1-18.

Wierschem et al. Passive Damping Enhancement of a Two-Degree-of-Freedom System through a Strongly Nonlinear Two-Degree-of-Freedom Attachment. Journal of Sound and Vibration 2012; 331(25):5393-407.

Williams et al. Analysis of a Micro-Electric Generator for Microsystems. Sensors and Actuators A: Physical 1996; 52(1-3):8-11.

Wu et al. Nonlinear vibration energy harvesting device integrating mechanical stoppers used as synchronous mechanical switches. Journal of Intelligent Material Systems and Structures 2014, 25, 1658-1663.

Xie et al. Increased energy harvesting and reduced accelerative load for backpacks via frequency tuning. Mechanical Systems and Signal Processing 58 (2015): 399-415.

Yamasaki et al. Forecasting Supercritical and Subcritical Hopf Bifurcations in Aeroelastic Systems. International Journal of Non-Linear Mechanics. 94 (2017): 400-405.

Yang et al. Characterization of Contact Kinematics and Application to the Design of Wedge Dampers in Turbomachinery Blading: Part 1—Stick-Slip Contact Kinematics. Journal of Engineering for Gas Turbines and Power—Transactions of the ASME 1998; 120(2):410-7.

Yang et al. Stick-Slip-Separation Analysis and Non-Linear Stiffness and Damping Characterization of Friction Contacts Having Variable Normal Load. Journal of Sound and Vibration 1998; 210(4):461-81.

Yang et al. Characterization of 3D Contact Kinematics and Prediction of Resonant Response of Structures Having 3D Frictional Constraint. Journal of Sound and Vibration 1998; 217(5):909-25.

Yang et al. Characterization of Contact Kinematics and Application to the Design of Wedge Dampers in Turbomachinery Blading: Part 2—Prediction of Forced Response and Experimental Verification. Journal of Engineering for Gas Turbines and Power—Transactions of the ASME 1998; 120(2):418-23.

Yang et al. A Reduced-Order Model of Mistuning Using a Subset of Nominal System Modes. Journal of Engineering for Gas Turbines and Power—Transactions of the ASME 2001; 123:893-900.

Yang et al. An Adaptive Extended Kalman Filter for Structural Damage Identification. Structural Control & Health Monitoring 2006; 13(4):849-67.

Yap et al. A Comparative Study of Structural Dynamic Modification and Sensitivity Method Approximation. Mechanical Systems and Signal Processing 2002; 16(4):585-97.

ŻAK et al. "Vibration of a laminated composite plate with closing delamination." Journal of Intelligent Material Systems and Structures 12.8 (2001): 545-551.

Zhivomirov et al. A method for single-tone frequency estimation. Romanian Journal of Acoustics and Vibration, 2016, 13, 20-24.

Zhou et al. Dynamic Analysis and Diagnosis of a Cracked Rotor. Journal of Vibration and Acoustics—Transactions of the ASME 2001; 123(4):539-43.

Zimmerman et al. Model Correlation Using Multiple Static Load and Vibration Tests. AIAA Journal 1995; 33(11):2182-8.

Zimmerman et al. Evolutionary Approach for Model Refinement. Mechanical Systems and Signal Processing 1999; 13(4):609-25.

Zimmerman. Model Validation and Verification of Large and Complex Space Structures. Inverse Problems in Engineering 2000; 8(2):93-118.

Extended European Search Report, dated Aug. 28, 2023, issued in connection with EP Patent Application No. 20846889.2.

International Search Report and Written Opinion, issued by the International Searching Authority (ISA/US) in PCT Application No. PCT/US2020/044472 on Oct. 16, 2020. 13 pages.

Sun, Min et al. "Dynamics of nonlinear primary oscillator with nonlinear energy sink under harmonic excitation: effects of nonlinear stiffness." Mathematical Problems in Engineering vol. 2018, Article ID 5693618, Sep. 2, 2018. 14 pages.

Tien, Meng-Hsuan et al. "A generalized bilinear amplitude and frequency approximation for piecewise-linear nonlinear systems with gaps or prestress." Nonlinear Dynamics 88.4 (2017): 2403-2416.

\* cited by examiner

DEVICE AND METHOD FOR CONTROLLING VIBRATION WITH PIECEWISE-LINEAR NONLINEARITY

CROSS REFERENCE TO RELATED APPLICATIONS

This application is a national stage application filed under 35 U.S.C. § 371 of PCT/US2020/044472 filed Jul. 31, 2020, which claims the benefit of U.S. Provisional Patent Application No. 62/881,113, filed Jul. 31, 2019, the content of which is incorporated herein by reference in its entirety.

BACKGROUND

Vibration energy harvesting is considered one of the most promising green energy sources that can self-power small-scale devices and fulfill the need of large-scale electricity generation. On one hand, as electronic devices are becoming more compact and portable, a sustainable and scalable energy source with high energy density is in high demand. Ambient vibration is an ideal energy source for these systems since it is ubiquitous and easily accessible. On the other hand, large-scale vibrations such as ocean waves are now considered to be a potential energy resource to power entire cities since they contain a remarkable amount of recoverable energy. Thus, vibration energy harvesting is an attractive solution in fulfilling a variety of energy needs and a great amount of research has been conducted to optimize energy extraction from vibration sources.

Vibration energy harvesting can be realized using piezoelectric, electromagnetic, or electrostatic approaches. Early designs of these power generators were based on linear models that provide the maximum power generation efficiency at resonance with their efficiency, decreasing dramatically even when the excitation frequency shifts slightly. Thus, traditional linear energy harvesters are usually limited to very narrow frequency ranges. In order to broaden the frequency bandwidth for effective energy harvesting, different techniques such as nonlinear energy harvesting, array-harvester systems, and frequency-tunable systems have been developed so the harvester can accommodate a broader frequency range. Each technique has its own advantages and disadvantages. For instance, the array-harvester design can harvest the vibration energy over the resonant frequencies of each linear system; however, the system setup and the corresponding electronic configuration are complex, which makes the utilization very, challenging. Nonlinear energy harvesters, which are commonly used in piezoelectric and electromagnetic generators, can broaden the effective frequency bandwidth by exploiting geometric and material nonlinearities. However, these nonlinear techniques are not as efficient as linear energy harvesters at resonance.

Recently, new designs of energy harvesters with piecewise-linear (PWL) nonlinearities have been proposed. These nonlinear devices incorporate mechanical stoppers into conventional linear energy harvesters. It is found that these KU harvesters can effectively, broaden the effective frequency range for an up-sweep excitation condition. However, these devices do not guarantee the best vibration performance at an arbitrary excitation frequency. Also, they do not achieve the efficiency of linear harvesters at resonance.

Thus, a need exists for a vibration energy harvester that can perform efficiently at varying frequencies.

SUMMARY

Various implementations include a device for controlling vibration with piecewise-linear nonlinearity. The device includes a stiffness element, a mass, a stopper, and an actuator. The stiffness element is expandable and compressible along an axis. The mass is coupled to the stiffness element. The mass has a resting mass position along the axis. The actuator is coupled to the stopper. The actuator is configured to move the stopper along the axis to vary a gap size. The gap size is measured as a distance between the resting mass position and a resting stopper position.

In some implementations, the stiffness element is a spring. In some implementations, the spring is a linear spring. In some implementations, the stiffness element is a cantilevered beam. In some implementations, the stiffness element is a coil of wire.

In some implementations, the device includes a damping element coupled to the mass. The damping element is expandable and compressible along the axis. In some implementations, the damping element is a linear viscous damper.

In some implementations, the stopper comprises a rigid material. In some implementations, the stopper comprises a stopper stiffness element. In some implementations, the stopper stiffness element is a stopper spring. In some implementations, the stopper spring is a linear spring. In some implementations, the stopper stiffness element is a cantilevered beam. In some implementations, the stopper stiffness element is a coil of wire.

In some implementations, the stopper includes a stopper damping element. In some implementations, the stopper damping element is a linear viscous damper.

In some implementations, the device includes a controller configured to determine an optimized gap size based on an identified dominant frequency and amplitude of an excitation signal and to cause the actuator to move the stopper along the axis toward the optimized gap size. In some implementations, the optimized gap size is determined using bilinear amplitude approximation (BAA). In some implementations, the optimized gap size is determined using non-dimensional calculations.

In some implementations, the gap size is a negative distance such that the stopper prestresses the stiffness element.

Various other implementations include a method of controlling vibration with piecewise-linear nonlinearity. The method includes (a) introducing a device like the device described above for controlling vibration with piecewise-linear nonlinearity to an excitation signal, (b) measuring or computing the excitation signal, (c) identifying a dominant frequency and amplitude of the excitation signal, (d) determining an optimized gap size based on the identified dominant frequency and amplitude of the excitation signal, and (e) moving the stopper along the axis toward the optimized gap size.

In some implementations, the method further includes repeating steps (b)-(e).

In some implementations, the initial gap size is zero.

In some implementations, the stiffness element is a spring. In some implementations, the spring is a linear spring. In some implementations, the stiffness element is a cantilevered beam. In some implementations, the stiffness element is a coil of wire.

In some implementations, the device further includes a damping element coupled to the mass. The damping element being expandable and compressible along the axis. In some implementations, the damping element is a linear viscous damper.

In some implementations, the stopper includes a rigid material. In some implementations, the stopper includes a stopper stiffness element. In some implementations, the stopper stiffness element is a stopper spring. In some implementations, the stopper spring is a linear spring in some implementations, the stopper stiffness element is a cantilevered beam. In some implementations, the stopper stiffness element is a coil of wire.

In some implementations, the stopper includes a stopper damping element in some implementations, the stopper damping element is a linear viscous damper.

In some implementations, the device further includes a controller configured to determine the optimized gap size. In some implementations, the optimized gap size is determined using bilinear amplitude approximation (BAA). In some implementations, the optimized gap size is determined using non-dimensional calculations.

In some implementations, the gap size is a negative distance such that the stopper prestresses the stiffness element.

Various other implementations include a device for controlling vibration with piecewise-linear nonlinearity. The device includes one or more stiffness elements, one or more masses, one or more stoppers, and one or more actuators. Each of the one or more stiffness elements is expandable and compressible along an axis. Each of the one or more masses is coupled to one or more stiffness elements. Each of the one or more masses has a resting mass position along its axis. Each of the one or more actuators is coupled to one of the one or more stoppers. Each of the one or more actuators is configured to move the one of the one or more stoppers along the axis of one of the one or more stiffness elements to vary a gap size. The gap size is measured as a distance between the resting mass position and a resting stopper position of the one of the one or more stoppers.

In some implementations, at least one of the stiffness elements is a spring. In some implementations, at least one of the springs is a linear spring. In some implementations, at least one of the stiffness elements is a cantilevered beam. In some implementations, at least one of the stiffness elements is a coil of wire.

In some implementations, the device includes one or more damping elements. Each of the one or more damping elements is coupled to one of the one or more masses. The one or more damping elements are expandable and compressible along the axis. In some implementations, at least one of the damping elements is a linear viscous damper.

In some implementations, at least one of the stoppers comprises a rigid material. In some implementations, at least one of the stoppers comprises a stopper stiffness element. In some implementations, at least one of the stopper stiffness elements is a stopper spring. In some implementations, at least one of the stopper springs is a linear spring. In some implementations, at least one of the stopper stiffness elements is a cantilevered beam. In some implementations, at least one of the stopper stiffness elements is a coil of wire.

In some implementations, at least one of the stoppers includes a stopper damping element. In some implementations, at least one of the stopper damping elements is a linear viscous damper.

In some implementations, the device includes a controller configured to determine an optimized gap size between each of the masses and corresponding stopper based on one or more identified frequencies and amplitudes of one or more excitation signals and to cause the one or more actuators to move the corresponding stoppers along the axes toward the optimized gap sizes. In some implementations, the optimized gap sizes are determined using bilinear amplitude approximation (BAA). In some implementations, the optimized gap sizes are determined using non-dimensional calculations.

In some implementations, at least one of the gap sizes is a negative distance such that one of the stoppers prestresses the corresponding stiffness element.

Various other implementations include a method of controlling vibration with piecewise-linear nonlinearity. The method includes (a) introducing a device like the device described above for controlling vibration with piecewise-linear nonlinearity to one or more excitation signals, (b) measuring or computing each of the excitation signals, (c) identifying one or more frequencies and amplitudes of each of the excitation signals, (d) determining an optimized gap size for each of the masses and corresponding stopper based on the identified one or more frequencies and amplitudes of each of the excitation signals, and (e) moving each of the stoppers along the corresponding axis toward the corresponding optimized gap size.

In some implementations, the method includes repeating steps (b)-(e).

In some implementations, at least one of the initial gap sizes is zero.

In some implementations, at least one of the stiffness elements is a spring. In some implementations, at least one of the springs is a linear spring. In some implementations, at least one of the stiffness elements is a cantilevered beam. In some implementations, at least one of the stiffness elements is a coil of wire.

In some implementations, the device includes one or more damping elements. Each of the one or more damping elements is coupled to one of the one or more masses. The one or more damping elements are expandable and compressible along the axis. In some implementations, at least one of the damping elements is a linear viscous damper.

In some implementations, at least one of the stoppers comprises a rigid material. In some implementations, at least one of the stoppers comprises a stopper stiffness element. In some implementations, at least one of the stopper stiffness elements is a stopper spring. In some implementations, at least one of the stopper springs is a linear spring. In some implementations, at least one of the stopper stiffness elements is a cantilevered beam. In some implementations, at least one of the stopper stiffness elements is a coil of wire.

In some implementations, at least one of the stoppers includes a stopper damping element. In some implementations, at least one of the stopper damping elements is a linear viscous damper.

In some implementations, the device includes a controller configured to determine an optimized gap size between each of the masses and corresponding stopper. In some implementations, the optimized gap sizes are determined using bilinear amplitude approximation (BAA). In some implementations, the optimized gap sizes are determined using non-dimensional calculations.

In some implementations, at least one of the gap sizes is a negative distance such that one of the stoppers prestresses the corresponding stiffness element.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Figure 1:
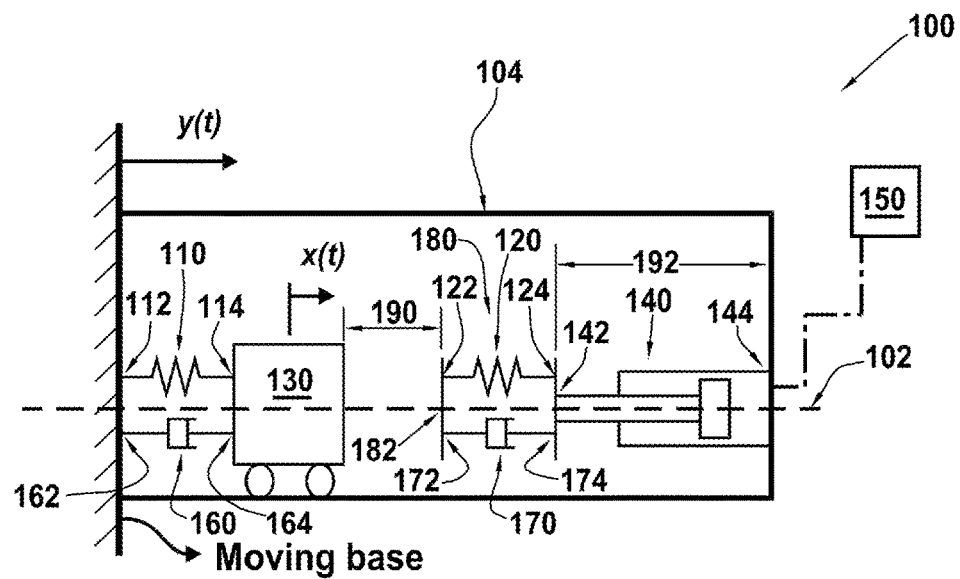
FIG. 1 is a side schematic view of a device for controlling vibration with piecewise-linear nonlinearity, according to one implementation.

The devices, systems, and methods disclosed herein provide a new way to efficiently control vibration by manipulating gaps of PWL nonlinear systems. The devices, systems, and methods can be exploited to design next-generation energy harvesters, vibration isolators, and vibration absorbers. Traditional linear vibration enhancement/reduction devices have the best performance when operating at resonant frequencies, while being limited to very narrow frequency ranges about these resonances. On the other hand, nonlinear devices can broaden the effective frequency bandwidth by exploiting different nonlinearities such as geometric or material nonlinearities. However, these nonlinear techniques are not as efficient as linear devices at resonance. The disclosed devices, systems, and methods provide for a novel solution for vibration enhancement and reduction by incorporating PWL nonlinearities into system design. The new designs incorporate mechanical stoppers or additional sets of springs and dampers into traditional linear systems. The resonant frequencies and amplitude of these systems can then be manipulated by adjusting the gap size between mechanical elements. The benefit of utilizing PWL nonlinearity in these systems is that a wide frequency range can be covered by shifting the resonant frequency through actively controlling the gap size in these systems while maintaining the high performance of a linear system at resonance.

Various implementations include a new vibration harvester composed of a PWL oscillator and a controllable gap. The resonant frequency of the harvester device can be tuned to match the dominant frequency of the excitation signal to provide the instantaneous optimized vibration performance. The frequency tenability is enabled by adjusting the gap size in the PWL oscillator.

Furthermore, a control method combining the response prediction, signal measurement, and gap adjustment mechanism is proposed to optimize the system's performance. In this control method, a response approximation technique referred to as the bilinear amplitude approximation (BAA) method is first used to compute the gap size that can tune the system to resonance over an effective frequency range. BAA is used to efficiently capture the nonlinear response of PWL nonlinear systems using linear techniques. Frequency and amplitude estimators can be employed to analyze the excitation signal over a specified time window. The gap in the PWL oscillator is then adjusted to the appropriate size that can optimize the vibration performance based on the measured excitation signal and the pre-computed optimized gap size. The proposed energy harvesting strategy has a better performance than current PWL harvesters since it provides a better vibration performance for both stationary excitation and drifting excitation conditions.

Various implementations include a device for controlling vibration with piecewise-linear nonlinearity. The device includes a stiffness element, a mass, a stopper, and an actuator. The stiffness element is expandable and compressible along an axis. The mass is coupled to the stiffness element. The mass has a resting mass position along the axis. The actuator is coupled to the stopper. The actuator is configured to move the stopper along the axis to vary a gap size. The gap size is measured as a distance between the resting mass position and a resting stopper position.

Various other implementations include a method of controlling vibration with piecewise-linear nonlinearity. The method includes (a) introducing a device like the device described above for controlling vibration with piecewise-linear nonlinearity to an excitation signal, (b) measuring or computing the excitation signal, (c) identifying a dominant frequency and amplitude of the excitation signal, (d) determining an optimized gap size based on the identified dominant frequency and amplitude of the excitation signal, and (e) moving the stopper along the axis toward the optimized gap size.

Various other implementations include a device for controlling vibration with piecewise-linear nonlinearity. The device includes one or more stiffness elements, one or more masses, one or more stoppers, and one or more actuators. Each of the one or more stiffness elements is expandable and compressible along an axis. Each of the one or more masses is coupled to one or more stiffness elements. Each of the one or more masses has a resting mass position along its axis. Each of the one or more actuators is coupled to one of the one or more stoppers. Each of the one or more actuators is configured to move the one of the one or more stoppers along the axis of one of the one or more stiffness elements to vary a gap size. The gap size is measured as a distance between the resting mass position and a resting stopper position of the one of the one or more stoppers.

Various other implementations include a method of controlling vibration with piecewise-linear nonlinearity. The method includes (a) introducing a device like the device described above for controlling vibration with piecewise-linear nonlinearity to one or more excitation signals, (b) measuring or computing each of the excitation signals, (c) identifying one or more frequencies and amplitudes of each of the excitation signals, (d) determining an optimized gap size for each of the masses and corresponding stopper based on the identified one or more frequencies and amplitudes of each of the excitation signals, and (e) moving each of the stoppers along the corresponding axis toward the corresponding optimized gap size.

FIG. 1 shows a device 100 for controlling vibration with piecewise-linear nonlinearity. The device 100 includes a housing 104, a mass 130, a stiffness element 110, a damping element 160, a stopper 180, an actuator 140, and a controller 150.

The stiffness element 110 shown in FIG. 1 is a linear spring having a first end 112 and a second end 114 opposite and spaced apart from the first end 112 of the stiffness element 110. The first end 112 of the stiffness element 110 is coupled to the housing 104 and the second end 114 of the stiffness element 110 is coupled to the mass 130.

The damping element 160 shown in FIG. 1 is a linear viscous damper having a first end 162 and a second end 164 opposite and spaced apart from the first end 162 of the damping element 160. The first end 162 of the damping element 160 is coupled to the housing 104 and the second end 164 of the damping element 160 is coupled to the mass 130.

The stiffness element 110 and the damping element 160 are aligned such that each are expandable and compressible along, or parallel to, the same axis 102. Thus, the mass 130 coupled to the second end 114 of the stiffness element 110 and the second end 164 of the damping element 160 is movable along, or parallel to, the axis 102 by expanding and/or compressing the stiffness element 110 and the damping element 160.

The stiffness element 110, damping element 160, and mass 130 are selected for the device 100 based on the expected excitation frequencies and amplitudes of the system into which the device 100 is designed to be introduced.

The stopper 180 shown in FIG. 1 includes a stopper stiffness element 120 and a stopper damping element 170. The stopper stiffness element 120 is a linear spring having a first end 124 and a second end 122 opposite and spaced apart from the first end 124 of the stopper stiffness element 120. The first end 124 of the stopper stiffness element 120 is coupled to the actuator 140 and the second end 122 of the stopper stiffness element 120 is coupled to a stopper plate 182.

The stopper damping element 170 shown in FIG. 1 is a linear viscous damper having a first end 174 and a second end 172 opposite and spaced apart from the first end 174 of the stopper damping element 170. The first end 174 of the stopper damping element 170 is coupled to the actuator 140 and the second end 172 of the stopper damping element 170 is coupled to the stopper plate 182.

The stopper stiffness element 120 and the stopper damping element 170 are aligned such that each are expandable and compressible along, or parallel to, the axis 102. Thus, as the mass 130 moves along the axis 102, the mass 130 moves away from and toward the stiffness plate 182 and can contact the stiffness plate 182 to compress each of the stopper stiffness element 120 and the stopper damping element 170.

The mass 130 has a resting mass position along the axis 102 at which the stiffness element 110 and damping element 160 are neither expanded nor compressed. The stopper plate 182 has a resting stopper position along the axis 102 at which the stopper stiffness element 120 and stopper damping element 170 are neither expanded nor compressed. The distance between the mass 130 at the resting mass position and the stopper 180 at the resting stopper position is the gap size 190. The gap size 190 can either be a positive number in which the mass 130 and stopper 180 are spaced apart, a negative number in which the mass 130 and stopper 180 abut each other and are prestressing the stiffening element 110 and damping element 160, or zero in which the mass 130 and stopper 180 abut each other but are not compressing the stiffening element 110 or damping element 160.

The actuator 140 shown in FIG. 1 is a linear actuator. The actuator 140 has a first end 142 and a second end 144 opposite and spaced apart from the first end 142 of the actuator 140. The stopper 180 is coupled to the first end 142 of the actuator 140 and the second end 144 of the actuator 140 is coupled to the housing 104. The actuator 140 is actuatable along, or parallel to, the axis 102 to move the stopper 180 closer or further from the mass 130 to vary the gap size 190.

The controller 150 is configured to determine an optimized gap size and actuate the actuator 140 to move the stopper 180 relative to the mass 130, thus varying the gap size 190 closer to the optimized gap size. When the device 100 is introduced to an excitation signal of a system, the starting gap size is zero to ensure that the mass 130 and the stopper 180 are in contact with each other. The controller 150 measures the excitation signal, if possible, using an accelerometer. In some systems, the excitation signal cannot be measured directly and must instead be computed based on the response of the system. The controller 150 uses the measured or computed excitation signal to identify a dominant frequency and amplitude of the excitation signal. The controller 150 then uses bilinear amplitude approximation (BAA) to determine the optimized gap size based on the identified dominant frequency and amplitude of the excitation signal, as discussed below. The controller 150 then sends a signal to actuate the actuator 140 to move the stopper 180 along the axis 102 in the direction of the optimized gap size. The controller 150 continuously iterates this process to vary the gap size 190 in the direction of the optimized gap size. By adjusting the gap size 190 to the optimized gap size, the vibration performance of the device 100 can be optimized.

Figure 2:
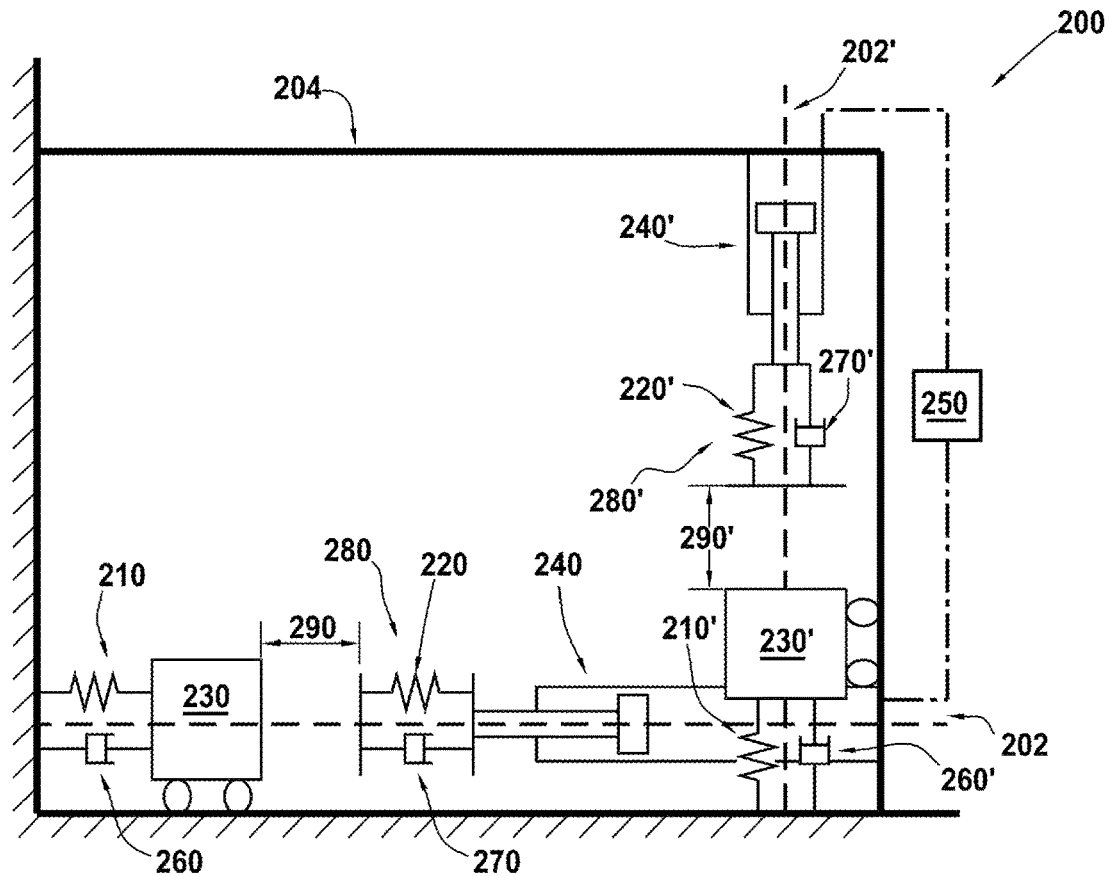
FIG. 2 is a side schematic view of a device for controlling vibration with piecewise-linear nonlinearity, according to another implementation.

FIG. 2 shows a device 200 for controlling vibration with piecewise-linear nonlinearity, according to another implementation. The device 200 can be introduced into a system having two or more excitation signals and can optimize the energy harvesting of the two or more excitation signals. The device 200 includes a first system including a first mass 230, a first stiffness element 210, a first damping element 260, a first stopper 280, and a first actuator 240 and a second system including a second mass 230', a second stiffness element 210', a second damping element 260', a second stopper 280', and a second actuator 240'. The first stopper 280 includes a first stopper stiffness element 220 and a first damping element 270, and the second stopper 280' includes a second stopper stiffness element 220' and a second damping element 270'. The first mass 230, first stiffness element 210, first damping element 260, first stopper 280, and first actuator 240 each move along, or parallel to, a first axis 202, and the second mass 230', second stiffness element 2/0', second damping element 260', second stopper 280', and second actuator 240' each move along, or parallel to, a second axis 202'. The first and second axes are transverse to each other. The first and second systems are disposed within the housing 204 and both systems are controlled by the controller 250.

Using the same process described above, the controller 250 determines the optimized gap size of each of the systems and actuates the first and second actuators 240, 240' to vary the first and second gap sizes 290, 290' toward the corresponding optimized gap sizes. Each of the optimized gap sizes can be determined based on the frequency and amplitude of two separate excitation signals or can be determined based on multiple frequencies and amplitudes within the same excitation signal.

Although the device shown in FIG. 2 has two systems along two different axes, in other implementations, the device includes three or more systems and the components of each system move along different axes. In some implementations, all of the axes are transverse to each other. In some implementations, one or more axes are parallel to each other.

Although the stiffness elements and the stopper stiffness elements shown in FIGS. 1 and 2 are all linear springs, in other implementations, the stiffness element and/or the stopper stiffness element are a non-linear spring, any other type of spring, a cantilevered beam, a coil of wire, an elastic band, or any device capable of resiliently deflecting under a load. The stoppers shown in FIGS. 1 and 2 all include a stopper stiffness element and a stopper damping element, but in other implementations, the stopper includes a rigid material and does not include a stopper stiffness element and a stopper damping element.

Although the damping elements and stopper damping elements shown in FIGS. 1 and 2 are all linear viscous dampers, in other implementations, the damping element is any device capable of dissipating the mechanical energy of the mass into another form of energy (e.g., heat energy). In some implementations, the device does not include a damping element or damping is provided by the inherent damping of the stiffening element or other features of the device.

In some implementations, a system within a device can include more than one stiffness element, damping element, stopper stiffness element, and/or stopper damping element.

Although the devices shown in FIGS. 1 and 2 are energy harvesting devices, in other implementations, the devices are vibration absorbers and the optimized gap size is a resonant frequency for an excitation signal.

The equations of motion for the system of the device 100 shown in FIG. 1 can be expressed as $$m\ddot{\bar{x}}_c(t)+(c+c^*)\dot{\bar{x}}_c(t)+k+k^*)\bar{x}_c(t)=-m\ddot{y}(t)+k^*g \text{ when}$$
$$T \geq g, m\ddot{\bar{x}}_o(t)+c\dot{\bar{x}}_o(t)+k\bar{x}_o(t)=-m\ddot{y}(t) \text{ when} x<g, \quad (21)$$

where m is the mass 130, k is the linear spring coefficient for the stiffness element 110, c is the damper coefficient for the damping element 160, k* is the linear spring coefficient for the stopper stiffness element 120, c* is the damper coefficient for the stopper damping element 170, y(t) is the displacement of the device 100 by the excitation signal, x(t) is the displacement of mass m 130 along the axis 102, and g is the gap size 190. $\bar{x}=x-y$ represents the relative displacement between the mass m 130 and the moving device 100. Note that the subscript c represents the displacement of the mass 130 when the gap 190 is closed, i.e., $\bar{x} \geq g$, and the subscript o represents the displacement of the mass 130 when the gap 190 is open, i.e., $\bar{x}<g$ Eqn. (2.1) can then be rewritten as $$\ddot{\bar{x}}_c(t)+2(\zeta\omega+\zeta^*\omega^*)\dot{\bar{x}}_c(t)+\left(\omega^2+\omega^{*2}\right)\bar{x}_c(t)= \text{ when } \bar{x} \geq g, \quad (2.2)$$
$$-\ddot{y}(t)+\omega^{*2}g$$
$$\ddot{\bar{x}}_o(t)+2\zeta\omega\dot{\bar{x}}_o(t)+\omega^2\bar{x}_o(t)=-\ddot{y}(t) \text{ when } \bar{x} < g,$$
$$\text{where } \omega^2 = \frac{k}{m}, \omega^{*2} = \frac{k^*}{m}, \zeta = \frac{c}{2m\omega}, \text{ and } \zeta^* = \frac{c^*}{2m\omega^*}.$$

Herein, it is assumed that the system is driven by a harmonic excitation signal $y(t)=y_0 \sin(\alpha t)$, where $Y_0$ is the excitation amplitude and $\alpha$ is the excitation frequency.

Next, dimensionless variables are introduced to simplify the subsequent analysis. First, the time-related dimensionless variables are introduced:

$$\tau = \omega t, \rho = \frac{\alpha}{\omega}, \rho^* = \frac{\omega}{\omega^*}. \quad (2.3)$$

Eqn. (2.2) can then be expressed as $$\bar{x}'_c(\tau)+2(\zeta+f^*\rho^*)\bar{x}'_c(\tau)+(1+\rho^{*2})\bar{x}_c(\tau)=\rho^2 y_0 \sin(\rho\tau)+ \rho^{*2}g \text{ when } \bar{x} \geq g, \bar{x}'_o(\tau)+2\zeta\bar{x}'_o(\tau)+\bar{x}_o(\tau)=\rho^2 y_0 \sin (\rho\tau) \text{ when} x<g, \quad (24)$$

where the prime symbol (') indicates differentiation with respect to the dimensionless time variable $\tau$. Finally, the following spatial dimensionless variables are used:

$$u = \frac{\bar{x}}{y_0}, \delta = \frac{h}{y_0}. \quad (2.5)$$

The dimensionless equations of motion can be written as $$\mu'_c(\tau)+2(\zeta+\zeta^*\tau)\mu'_c(\tau)+(1+\tau^{*2})\mu_c(\tau)=\tau^2 \sin(\rho\tau)+\tau^{*2}\delta \text{ when } \mu \geq \delta, \mu'_o(\tau)+2(\mu'_o(\tau)\mu_o(\tau)=\tau^2 \sin(\rho\tau) \text{ when } \mu<\delta, \quad (26)$$

Note that the nondimensionalization allows pre-computation of all the responses for all base displacement levels since the response has been scaled by $y_0$. This enables offline pre-computation of all information needed in the control method described herein. Moreover, scaling the frequency by $\omega$ enables efficient design of the parameters of the harvester system without reconducting the analysis.

In order to efficiently analyze the steady-state dynamics of the device 100, the BAA method is applied to find the solution to Eqn. (2.6). First, the coordinates of the device 100 in its closed and open state are analytically expressed as combinations of the linear transient response and the linear steady-state response:

$$u_c(\tau) = e^{-\bar{\zeta}\bar{\rho}\tau}a_o\sin\left(\sqrt{1-\bar{\zeta}^2}\,\bar{p}\tau + \phi_c\right)+ \quad (3.1)$$
$$\frac{(\rho/\bar{p})^2\sin(\rho\tau - \theta_c + \psi)}{\sqrt{[1-(\rho/\bar{p})^2]^2 + (2\bar{\zeta}\rho/\bar{p})^2}} + \delta\left(\frac{\rho^{*2}}{1+\rho^{*2}}\right).$$

$$u_c(\tau) = e^{-\zeta\tau}a_o\sin\left(\sqrt{1-\zeta^2}\,\tau + \phi_o\right) + \frac{\rho^2\sin(\rho\tau - \theta_o + \psi)}{\sqrt{(1-\rho^2)^2 + (2\zeta\rho)^2}},$$

$$\text{where } \bar{p} = \sqrt{1+\rho^{*2}}, \bar{\zeta} = \frac{\zeta+\zeta^*\rho^*}{\sqrt{1+\rho^{*2}}},$$

$$\theta_c = \tan^{-1}\left(\frac{2\bar{\zeta}\rho\bar{p}}{\bar{p}^2-\rho^2}\right), \text{ and } \theta_o = \tan^{-1}\left(\frac{2\zeta\rho}{1-\rho^2}\right);$$

$[\alpha_c, \alpha_o]$ and $[\phi_c, \phi_o]$ are scalar coefficients and phase angles of the linear transient responses, respectively. The angle $\psi$ reflects the phase difference between the excitation and the linear steady-state responses.

Figure 3:
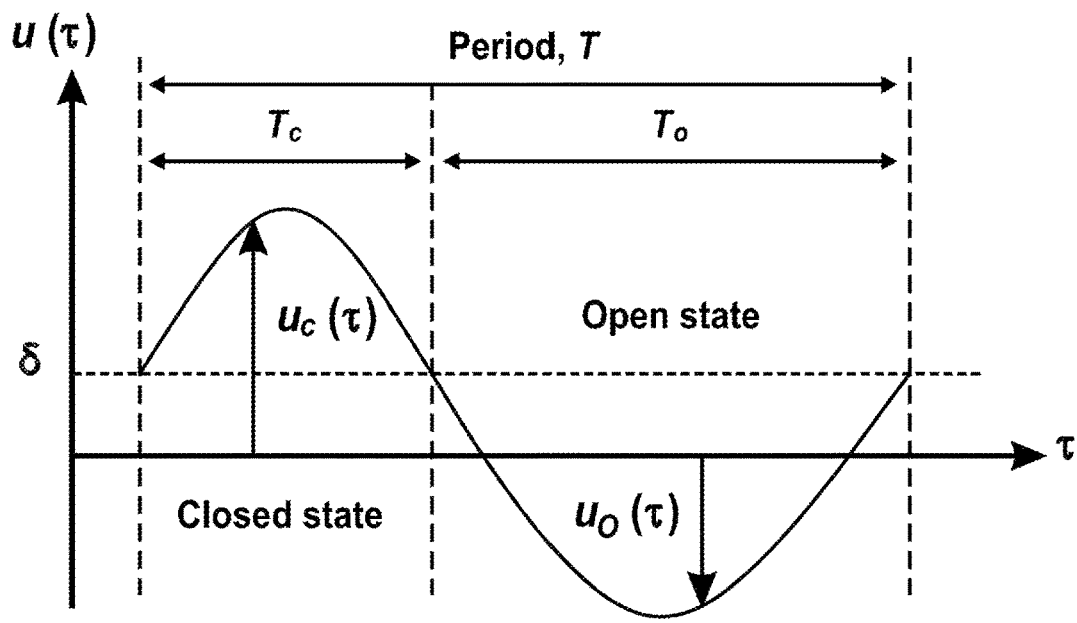
FIG. 3 is a graph of a nonlinear vibration cycle of the device of FIG. 1.

The key idea of the BAA method is that an entire vibration cycle of the PWL oscillator can be obtained by coupling the responses in the closed and open states. The motion of one vibration cycle is schematically shown in FIG. 3. The BAA method assumes that a single vibration cycle has only one time interval when the response is in the closed state and only one time interval when the response is in the open state. These time intervals are denoted using $T_c$ and $T_o$, respectively. Note that $T=T_c+T_o$ is the period of the harmonic excitation. Next, a nonlinear optimization solver is used to solve for the unknowns $\alpha_c$, $\alpha_o$, $\phi_c$, $\phi_o$, and $\psi$ in Eqn. (3.1) by minimizing the residual of a set of compatibility conditions listed as follows:

$$\mu_c(0)=\delta, \mu_c(T_c)=\delta, \mu_o(T_c)=\delta, \mu_o(T_c+T_o)=\delta, \mu'_c(T_c)=\mu'_o(T_c), \mu'_c(0)=\mu'_o(T_c+T_o). \quad (3.2)$$

The first four equations in Eqn. (3.2) represent the displacement compatibility conditions at the transition moment when the dimensionless displacement $\mu$ equals the dimensionless gap size $\delta$ when the system switches from one state to the other. The last two equations in Eqn. (3.2) represent the velocity compatibility conditions whereby the velocity of the mass 130 must be continuous at the moment of transition. Note that $T_c$ in Eqn. (3.2) is also an unknown since the time fraction that the system stays in two linear states cannot be predetermined. The function "lsqnonlin" in MATLAB can be used to solve for all the unknown parameters. One nonlinear vibration cycle can then be constructed once these unknowns are solved. The detailed description of the BAA method can be found in Tien ME, D' Souza K., "A generalized bilinear amplitude and frequency approximation for piecewise-linear nonlinear systems with gaps or prestress," Nonlinear Dynamics 88, 2403-2416 (2017), which is incorporated in its entirety by reference.

Figure 4:
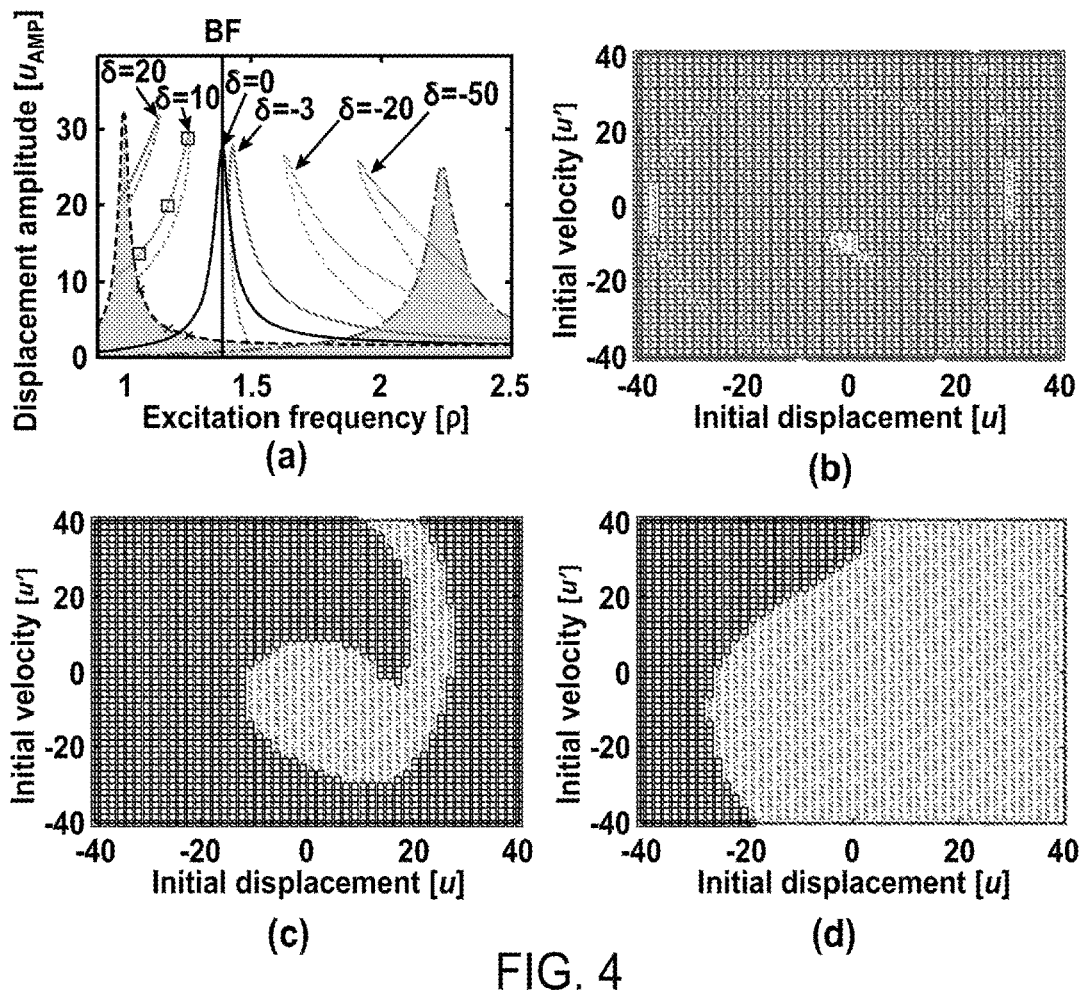
FIGS. 4(a)-4(d) are graphs of the performance and stability of the device of FIG. 1.

The nonlinear forced responses of the PWL oscillator device for different gap sizes $\delta$ are computed using the BAA method and plotted in FIG. 4(a). The system parameters used in this work are $\zeta$=0.015, $\zeta$*=0.015, and $\rho$*=2. The linear response of the system when the gap 190 is always closed and the linear response of the device 100 when the gap 190 is always open are also plotted in FIG. 4(a). FIG. 4(a) shows that the resonant frequency of the system can be shifted by changing the gap size $\delta$. The resonant frequency associated with $\delta$=0 is referred to as the bilinear frequency (BF). This resonant frequency can be lowered by increasing $\delta$ and can be raised by decreasing $\delta$. This implies that the resonant frequency of the harvester can be tuned to match an arbitrary excitation frequency over the frequency range bounded by the natural frequencies of the linear systems by adjusting the gap to the appropriate size. Furthermore, nonlinear characteristics such as multi-stability, instability, and jump phenomenon can be observed when $\delta \neq 0$.

Next, time integration can be used to investigate the basins of attraction for the system since multiple stable periodic responses can be observed. The Runge-Kutta method and the event function in MATLAB can be used to conduct time integration. The results of $\rho$=1.06, 1.17, and 1.25 when $\delta$=10 are plotted in FIGS. 4(b)-4(d). FIGS. 4(b)-4(d) show that the system, when $\delta$>0, can settle into either the nonlinear response where the intermittent contact happens or the linear response where there is no contact. Similarly, the system can settle into either the nonlinear response or the linear response where the gap 190 is always closed when $\delta$ <0. Furthermore, it is observed that the area of the basins of attraction of the nonlinear response shrinks significantly when $\rho$ approaches the resonant frequency. Although the nonlinearity can provide a larger vibration motion when the excitation frequency is extremely close to the resonant frequency, it is also more likely that the system will jump from the nonlinear response to the linear response when it is slightly perturbed.

Figure 5:
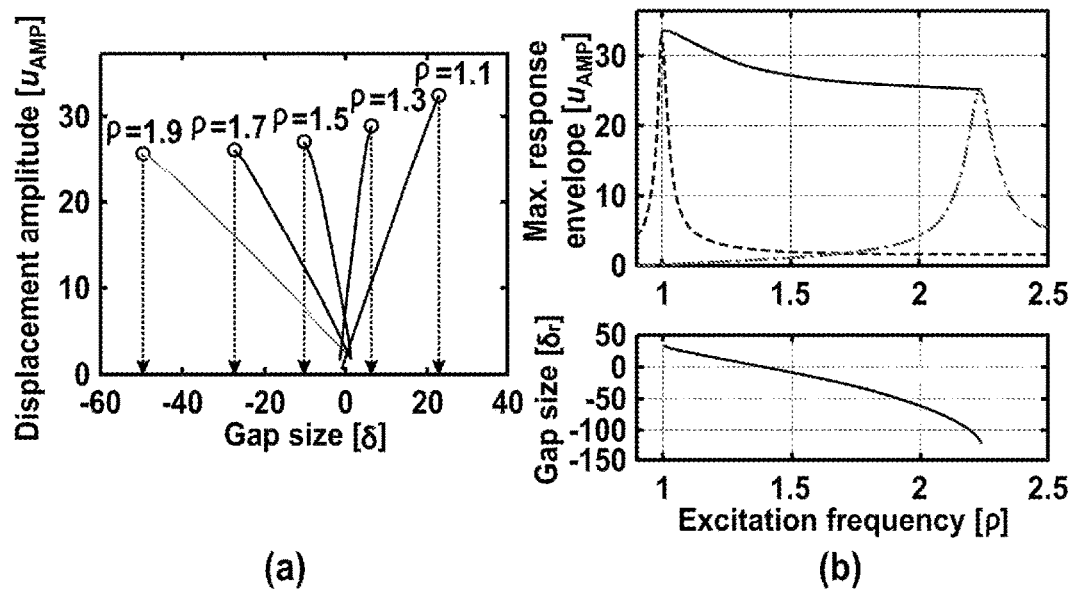
FIG. 5(a) is a graph of the δ-sweep process of the device of FIG. 1.
FIG. 5(b) is a graph of the maximum response envelope and peak gap size over the bounded frequency range for the device of FIG. 1.

In order to determine the gap size that can tune the system to resonance, the BAA method is employed to conduct two consecutive sweep processes. In the first sweep, the BAA method is used to sweep through the frequency range bounded by the natural frequencies of the linear systems (i.e., open and sliding systems) by setting $\delta$=0. In this $\rho$-sweep process, the nonlinear solver is provided with random initial values at the starting frequency point. The solution that results in the minimum residual and that obeys the physical constraints is chosen for the frequency sweep. Next, the peak response and the corresponding gap size at each frequency $\rho$ is found by sweeping through the gap size $\delta$. The $\delta$-sweep process starts from $\delta$=0 using the $\rho$-sweep result as the initial value and ends at a $\delta$ value where the solution cannot be found using BAA. The results of the $\delta$-sweep process for five different $\rho$ values are shown in FIG. 5(a). The peak responses are indicated using (o)'s in FIG. 5(a). Note that when $\rho$ is greater than the BF, $\delta$ is decreased to locate the peak response; while when $\rho$ is less than the BF, $\delta$ is increased to find the peak response. The gap size associated with the peak response is referred to as the resonant gap size $\delta_r$. These resonant gap sizes are indicated using downwardly facing arrows in FIG. 5(a). $\delta_r$ represents the gap size that can theoretically provide the maximum steady-state vibration amplitude at a specified excitation frequency $\rho$ if the excitation signal is perfectly harmonic. FIG. 5(a) also shows that the vibration displacement amplitude is roughly proportional to $\delta$. By successively applying the $\delta$-sweep process to each excitation frequency p the maximum response and the corresponding r over the bounded frequency range can be efficiently determined using the BAA method. The maximum response envelope and the corresponding $\delta_r$ values over the frequency range are plotted in FIG. 5(b).

With $\delta_r$ values computed, the vibration amplitude of the PWL oscillator can be amplified by adjusting the gap size to approach $\delta_r$ at any excitation frequency within the bounded frequency range. However, energy harvesters are rarely driven by perfectly a harmonic excitation with a stable frequency and amplitude. Thus, a signal measurement and analysis process and a gap size adjustment strategy are introduced in this work. This control process assumes that the excitation signal is measurable through sensing devices and the gap size can be adjusted instantaneously based on the measured signal. Moreover, the excitation is assumed to contain a single frequency component that dominates the base motion at any given time. However, the excitation is accompanied by perturbation, and the dominant frequency and the corresponding amplitude can drift through time. The control process is described as follows:

(i) The measured excitation signal is collected over a specified time duration $T_s$.

(ii) The collected signal is analyzed using frequency and amplitude estimators to extract the frequency $\alpha_{est}$ and amplitude $y_{0,est}$ that dominate the base motion.

(iii) The $\delta_r$ associated with $\rho_{est}$ $\alpha_{est}/\omega$ has been pre-computed using BAA is identified. Note that $\rho_{est}$ generally does not hit a frequency point that has been pre-computed: $\delta_r$ at arbitrary $\rho_{est}$ can be obtained by interpolating adjacent $\delta_r$ values.

(iv) The optimized gap size $\delta_{opt}$ is determined by using only a fraction of $\delta_r$ to avoid jumping from the nonlinear response to the linear response: $\delta_{opt} = \alpha \delta_r$, where $0 < \alpha < 1$.

(v) The gap size is adjusted to $\vartheta_{opt} = y_{0,est} \delta_{opt}$.

(vi) Steps (i)-(v) are repeated for next time window.

Figure 6:
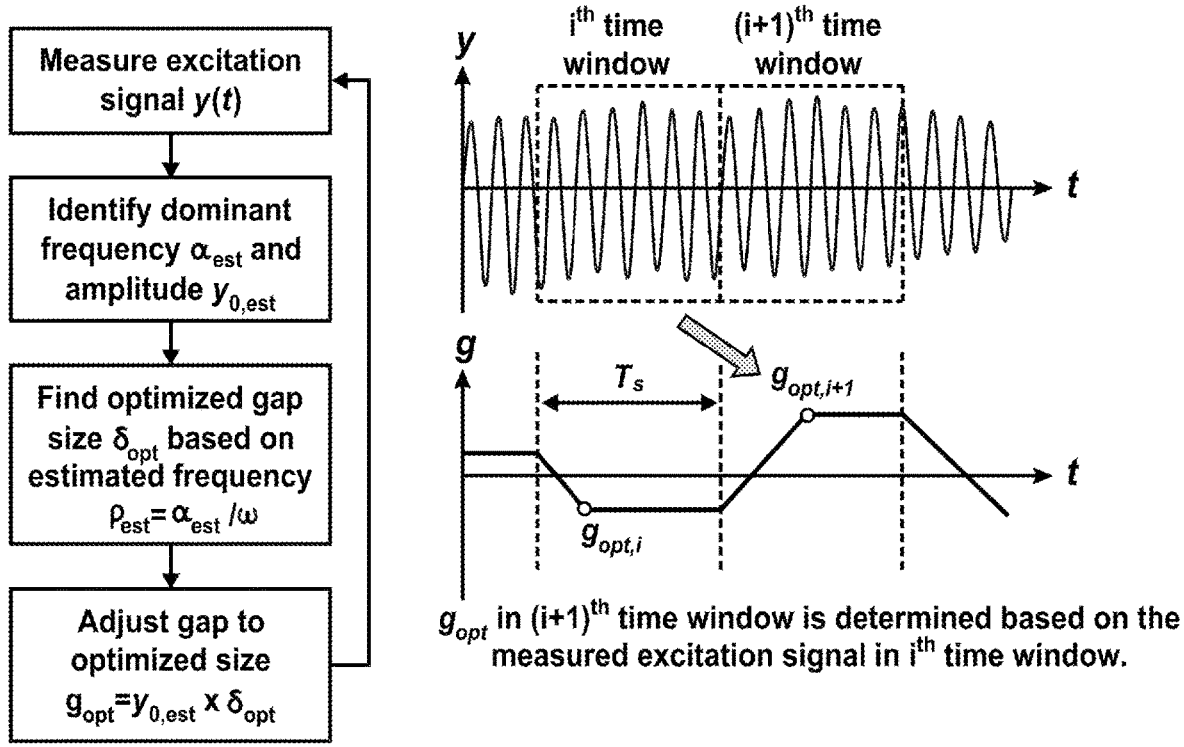
FIG. 6 is a flow chart and graph of the control process for optimizing the vibration performance of the device of FIG. 1.
Figure 7:
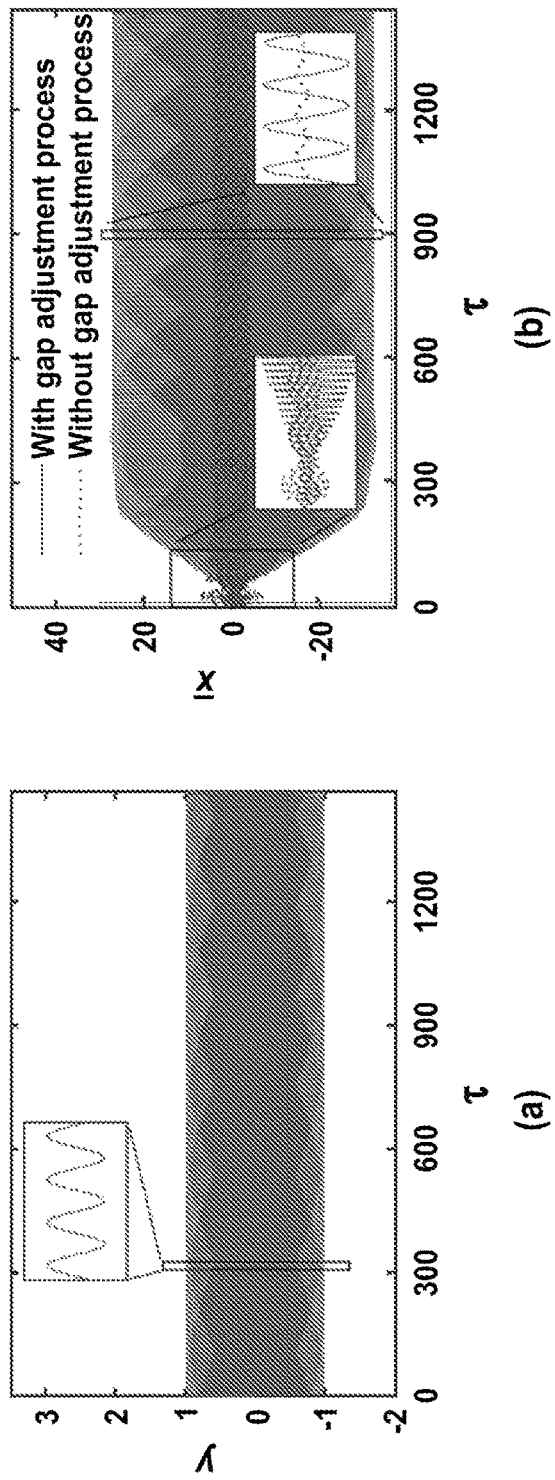
FIGS. 7(a)-(d) are graphs of numerical simulation with unperturbed stationary excitation, according to another implementation.
Figure 7:
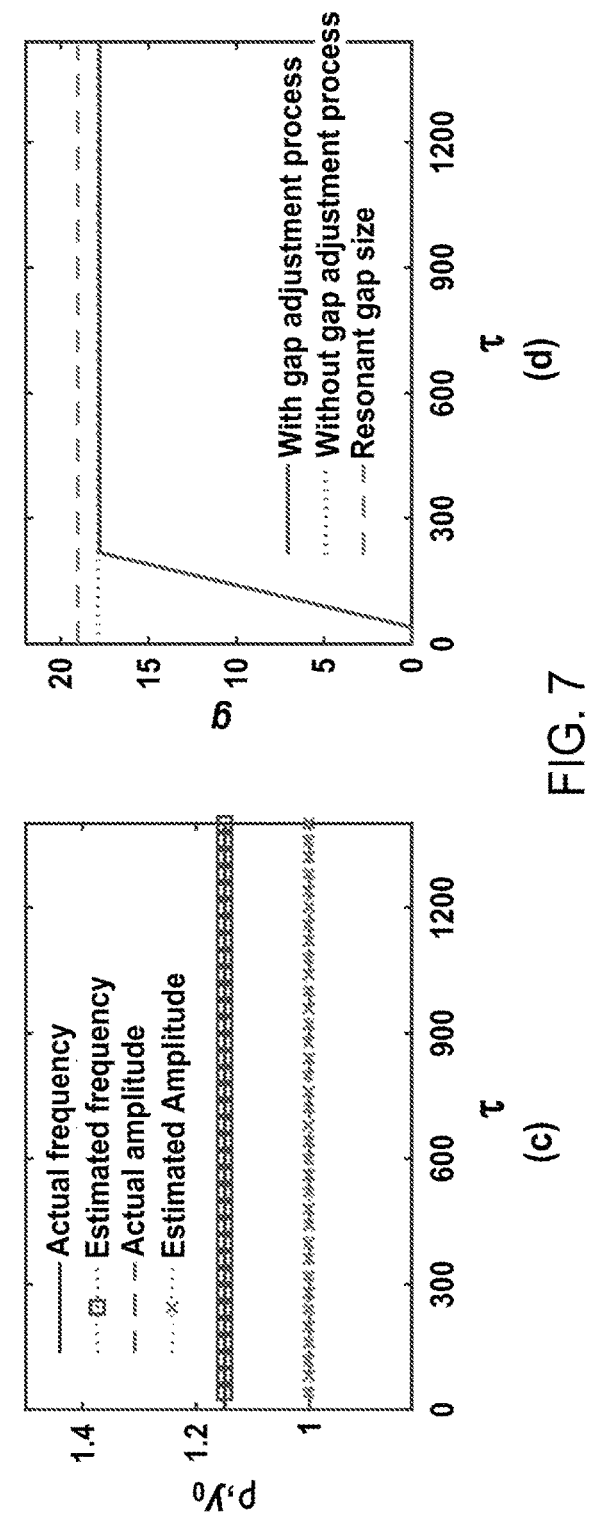

The dominant frequency and the associated amplitude can be estimated using methods developed by Zhivomirov et al. and Lyons, respectively. These methods build on discrete Fourier transform techniques and estimate the frequency and amplitude by analyzing the windowed signal in the frequency domain. It should also be noted that the system is more likely to jump to the linear response if α is close to 1. The overall control process is summarized in FIG. 6.

EXAMPLES

In this section, the PWL harvester integrated with the proposed control method is numerically investigated using time integration. Different excitation conditions are applied in case studies to validate the vibration performance of the system.

Example 1

The system subjected to a perfectly harmonic excitation with fixed excitation frequency and amplitude is studied first. In order to present the vibration amplitude variation, equations of motion with physical spatial variables, i.e., Eqn. (2.4), are used for time integration. The actual excitation amplitude and frequency used in this case study are $y_o=1$ and $\rho=1.15$. Moreover, 94% of the resonant gap size is used as the optimized size to avoid the jump phenomenon, i.e., $\alpha=0.94$. Two gap size control strategies are compared in the study: (1) fixing the gap at the optimized size and (2) starting from g=0 and gradually approaching the optimized gap size with the proposed control method. The mass is assumed to have zero initial displacement and zero initial velocity, i.e., $(\bar{x}_0,\bar{x}'_0)=(0,0)$, in the simulation. The results are plotted in FIGS. 7(a)-7(d). FIGS. 7(a)-7(d) show that the signal estimators provide very accurate estimations for both the excitation frequency and amplitude when the base motion is perfectly harmonic. Furthermore, the vibration response with the gradual adjustment strategy has a root mean square (RMS) amplitude of 19.94. However, the RMS amplitude of the vibration response without this adjustment strategy is only 2.92 even when the gap size is optimized. When the gap size is fixed at the optimized size, the PWL oscillator converges to the linear response with a lower vibration amplitude since $(x_0,x'_0)=(0,0)$ in this case is in the basin of the attractor of the linear response as discussed above. Thus, current PWL harvesters do not always provide an improved vibration performance in an arbitrary excitation frequency given a random initial condition since they do not have the gap adjustment mechanism. This new vibration energy harvester is able to accumulate vibration energy when the gap size is initially zero and gradually adjust the gap 190 to the optimized size. This gradual adjustment process ensures that the system preserves the intermittent contact behavior during the transient response. Controlling the gap size is required even when the system is subjected to stationary excitation.

Example 2

Figure 8:
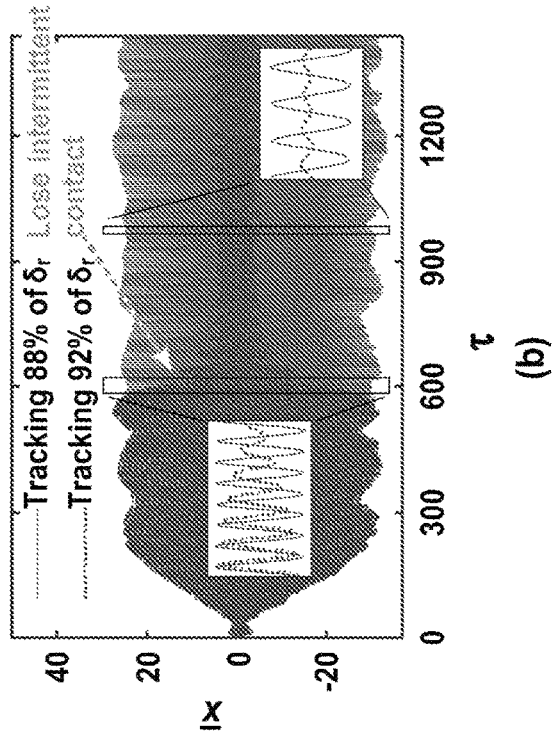
FIGS. 8(a)-(d) are graphs of numerical simulation with perturbed stationary, excitation, according to another implementation.
Figure 8:
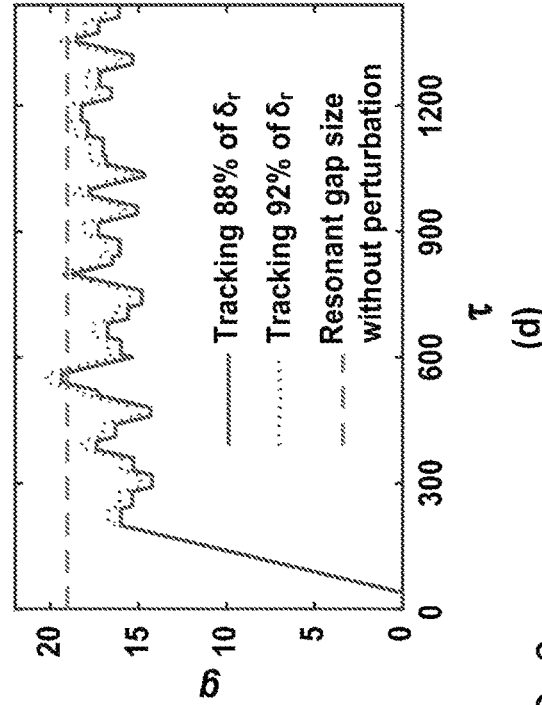
Figure 8:
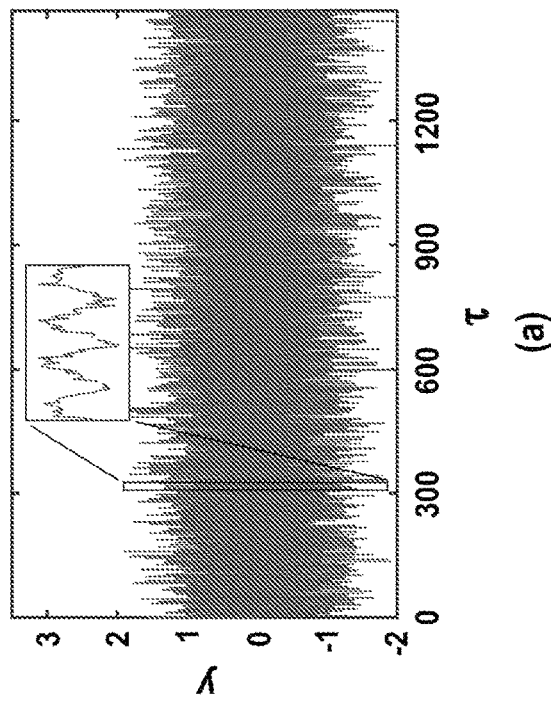
Figure 8:
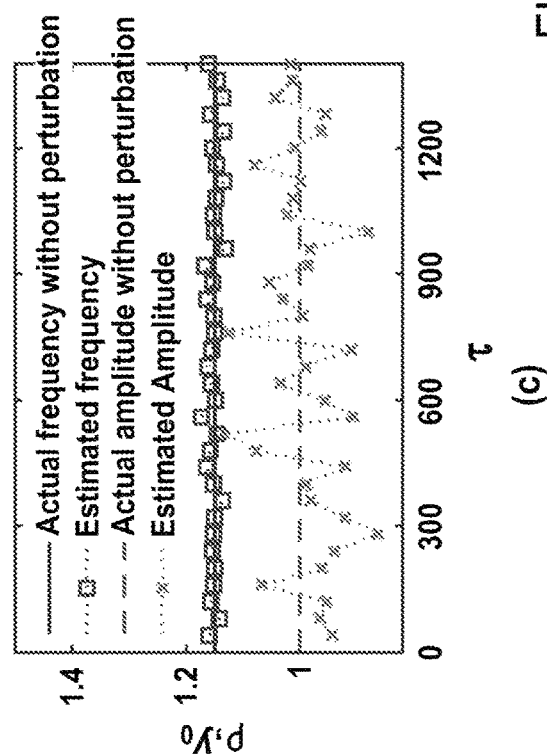
Figure 9:
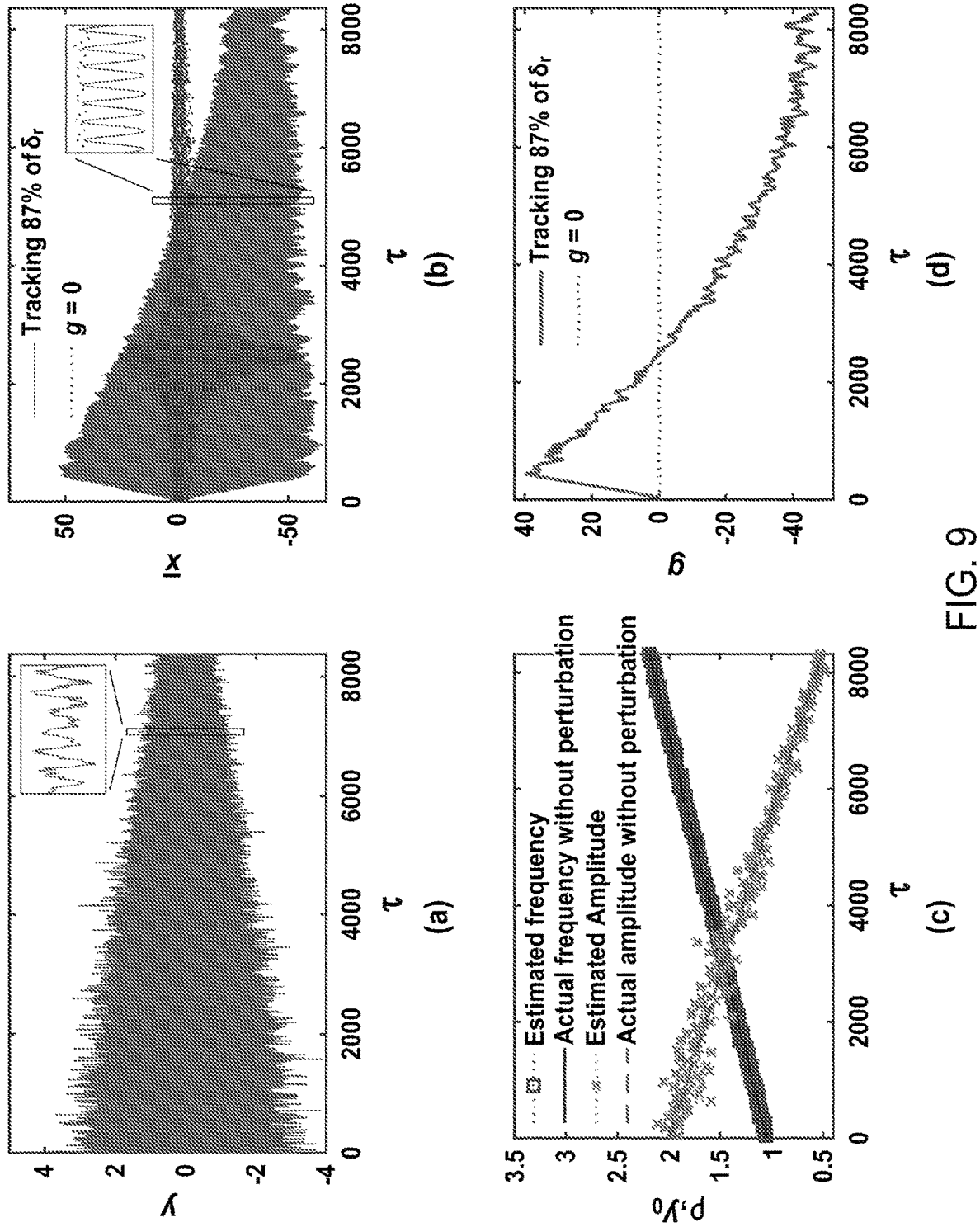
FIGS. 9(a)-(d) are graphs of numerical simulation with drifting excitation, according to another implementation.

The system subjected to a perturbed harmonic excitation with a fixed excitation frequency is studied in this case. In this study, the excitation is assumed to be perturbed by a normally distributed noise: $y(\tau)=y_0 \sin(\rho\tau)+\rho(\tau)$, where $y_0=1$, $\rho=1.15$ and $p(\tau)$ is the random perturbation with the variance being 35% of $y_o$. The results are plotted in FIGS. 8(a)-8(d), FIGS. 8(a)-8(d) show that the estimated frequency and amplitude both fluctuate around the ρ and $y_o$, values used in the excitation input, respectively. In particular, the estimated amplitude has a larger variation due to the excitation perturbation. Furthermore, the system responses of using two optimized gap sizes are compared in FIG. 8(b). The optimal gap size fluctuates due to changing estimated amplitude value as can be seen in FIGS. 8(c) and 8(d). When the system is tracking 88% of the resonant gap size, the PWL, oscillator maintains intermittent contact over the entire simulation time range. In contrast, the system loses the intermittent contact when it is tracking 92% of the resonant gap size. This implies that the absolute optimized gap size needs to be reduced to prevent the system from jumping to the linear response when subject to large variation in the excitation. The jump phenomenon significantly, reduces the vibration performance. Thus, there is a trade-off between maintaining a high vibration amplitude and avoiding the undesired jump phenomenon. Note that the nonlinear vibration amplitude is roughly proportional to the gap size, as discussed above.

Example 3

The case when the system is subjected to a gradually drifting excitation is studied next. In order to test how the proposed control method responds to changing excitation, both excitation frequency and amplitude are set up to drift through time. In this case study, the frequency gradually changes from $\rho=1.05$ to $\rho=2.2$ and the amplitude changes from $y_o=2.0$ to $y_o=0.5$ over the simulation time range. Note that a 35% perturbation of the amplitude is applied to the excitation signal and 87% (of the resonant gap size is used for gap optimization. The results are shown in FIGS. 9(a)-9(d). FIGS. 9(a)-9(d) show that both the estimated frequency and amplitude fluctuate around the actual values due to the perturbation and signal drifting; however, the estimators track the trend of changing excitation very well. The response of using the adjustable gap with the proposed control method is compared with the response of using g=0 in FIG. 9(b). It is shown that the PWL, oscillator can maintain intermittent contact after the gradual adjustment process when the gap 190 is tracking the optimized size that changes with the excitation. In contrast, the system only experiences resonance when the excitation frequency is close to the BF when the gap size is fixed at g=0. The RMS vibration amplitudes are 32.94 when using the adjustable gap and 6.96 when g=0. In summary, the proposed control strategy can provide the optimized vibration performance when the PWL harvester is driven by a changing excitation where the frequency drifts within the bounded frequency range.

Example 4

Figure 10:
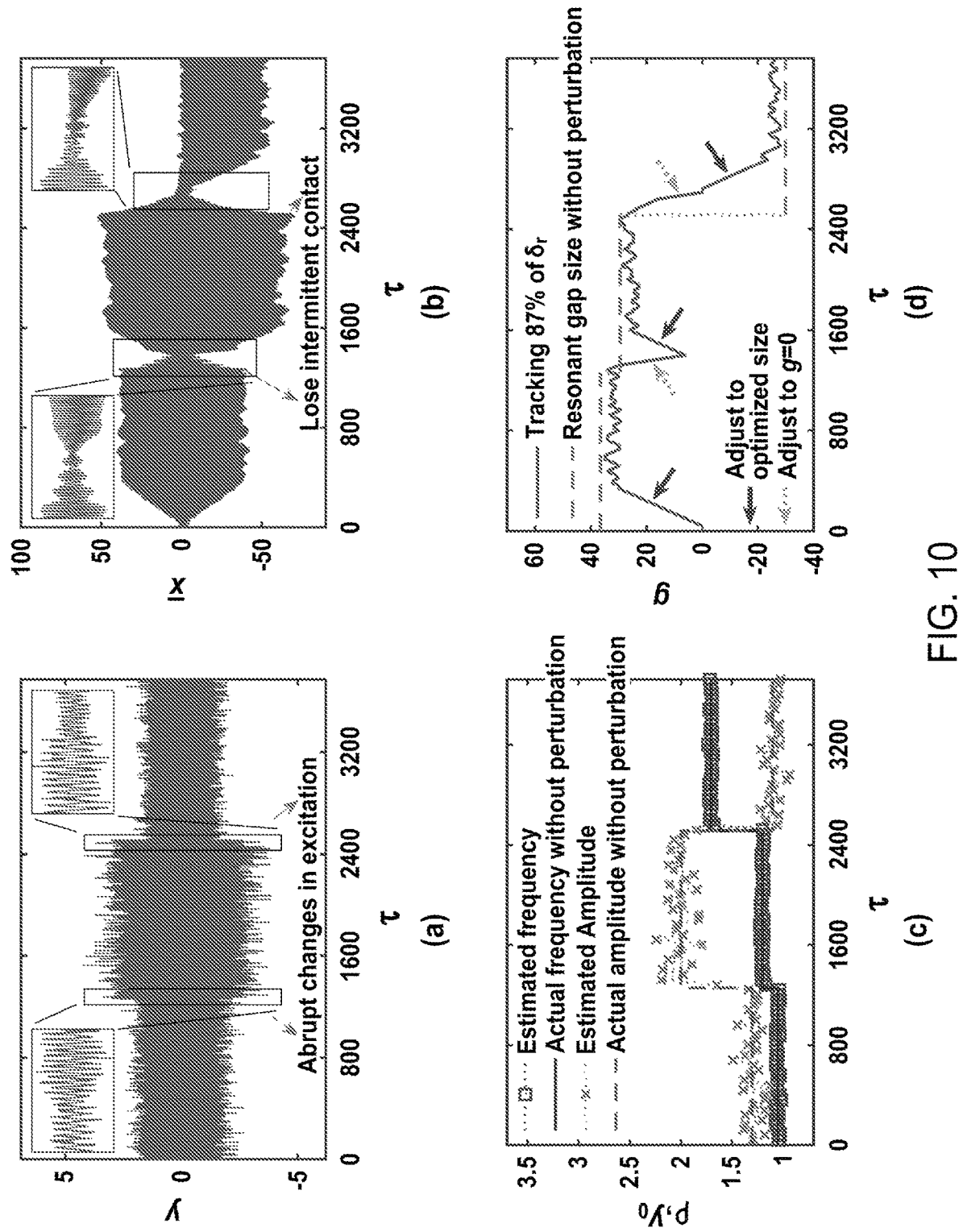
FIGS. 10(a)-(d) are graphs of numerical simulation with abruptly changing excitation, according to another implementation.

It has been shown that the proposed system can handle excitation with gradual changes in its frequency and amplitude. The case where the system is subjected to abruptly changing excitation is discussed next. In this case study, the system is subjected to piecewise stationary excitation with 35% perturbations in amplitude. The excitation frequency and amplitude within the three stationary regions are (ρ, $y_0$)=(1.05, 1.3), (1.20, 2.0), and (1.70, 1.1), respectively. The excitation condition changes abruptly when it switches from one stationary region to the next. The result of applying the controllable gap is plotted in FIGS. 10(a)-10(d). Note that 87% of the resonant gap size is used for the optimized gap size. FIG. 10(b) shows that the system loses the intermittent contact and tends to converges to the linear response shortly after the sudden changes in the excitation. In order to maximize the response, the gap size is adjusted to g=0 to trigger the intermittent contact behavior. Once the intermittent contact event is detected again, the gradual adjustment process is activated to bring the system back to the nonlinear response to enhance the vibration performance. Note that this control strategy can also be applied to the circumstance where the system loses the intermittent contact due to perturbations in the excitation, as discussed above in Example 2.

Disclosed are a device and method for an energy harvesting system with a PWL nonlinear oscillator and an adjustable gap. In this system, the resonant frequency of the device can be tuned to match the excitation frequency using a real-time control mechanism by adjusting the gap to the appropriate size. The control method integrates the fast prediction of the optimized gap size, signal estimators, and a gap adjustment mechanism to optimize the vibration performance over a broad frequency range while also being able to achieve the best performance at resonance. The simulation results show that the control method can enhance the vibration amplitude of the PWL harvester for both stationary and changing excitation conditions. The system can achieve a better vibration performance than traditional PWL harvesters with the gap size fixed at a constant. Furthermore, the energy harvesting strategy can be applied to piezoelectric or electromagnetic devices.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting" essentially of and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A device for controlling vibration with piecewise-linear nonlinearity, the device comprising:
   a stiffness element that is expandable and compressible along an axis;
   a mass coupled to the stiffness element, wherein the mass has a resting mass position along the axis;
   a stopper;
   an actuator coupled to the stopper, the actuator being configured to move the stopper along the axis to vary a gap size, wherein the gap size is measured as a distance between the resting mass position and a resting stopper position; and
   a controller configured to determine an optimized gap size based on an identified dominant frequency and amplitude of an excitation signal and cause the actuator to move the stopper along the axis toward the optimized gap size.

2. The device of claim 1, wherein the stiffness element is a spring.

3. The device of claim 2, wherein the spring is a linear spring.

4. The device of claim 1, wherein the stiffness element is a cantilevered beam.

5. The device of claim 1, wherein the stiffness element is a coil of wire.

6. The device of claim 1, further comprising a damping element coupled to the mass, the damping element being expandable and compressible along the axis.

7. The device of claim 6, wherein the damping element is a linear viscous damper.

8. The device of claim 1, wherein the stopper comprises a rigid material.

9. The device of claim 1, wherein the stopper comprises a stopper stiffness element.

10. The device of claim 1, wherein the stopper stiffness element is a stopper spring.

11. The device of claim 10, wherein the stopper spring is a linear spring.

12. The device of claim 1, wherein the stopper stiffness element is a cantilevered beam.

13. The device of claim 1, wherein the stopper stiffness element is a coil of wire.

14. The device of claim 1, wherein the stopper comprises a stopper damping element.

15. The device of claim 14, wherein the stopper damping element is a linear viscous damper.

16. The device of claim 1, wherein the optimized gap size is determined using bilinear amplitude approximation (BAA).

17. The device of claim 1, wherein the optimized gap size is determined using non-dimensional calculations.

18. The device of claim 1, wherein the gap size is a negative distance such that the stopper prestresses the stiffness element.

19. A method of controlling vibration with piecewise-linear nonlinearity, the method comprising:
   (a) introducing a device for controlling vibration with piecewise-linear nonlinearity to an excitation signal, the device comprising:
      a stiffness element that is expandable and compressible along an axis,
      a mass coupled to the stiffness element, wherein the mass has a resting position along the axis,
      a stopper, and
      an actuator coupled to the stopper, the actuator being configured to move the stopper along the axis to vary a gap size, wherein the gap size is measured as a distance between the resting mass position and a resting stopper position;
   (b) measuring or computing the excitation signal;
   (c) identifying a dominant frequency and amplitude of the excitation signal;

(d) determining an optimized gap size based on the identified dominant frequency and amplitude of the excitation signal; and (e) moving the stopper along the axis toward the optimized gap size.

* * * * *